(12) United States Patent
Graves et al.

(10) Patent No.: US 9,169,904 B2
(45) Date of Patent: Oct. 27, 2015

(54) MULTI-SPEED DRIVE FOR TRANSFERRING POWER TO A LOAD

(75) Inventors: Garreth Graves, Toronto (CA); Robert J. Laing, Moffat (CA); Andrew Malcolm Boyes, Aurora (CA); Gary J. Spicer, Mississauga (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 51 days.

(21) Appl. No.: 14/111,485

(22) PCT Filed: Apr. 11, 2012

(86) PCT No.: PCT/CA2012/050235
§ 371 (c)(1),
(2), (4) Date: Oct. 11, 2013

(87) PCT Pub. No.: WO2012/139224
PCT Pub. Date: Oct. 18, 2012

(65) Prior Publication Data
US 2014/0031156 A1 Jan. 30, 2014

Related U.S. Application Data

(60) Provisional application No. 61/474,253, filed on Apr. 11, 2011.

(51) Int. Cl.
*F16H 9/00* (2006.01)
*F16H 59/00* (2006.01)
(Continued)

(52) U.S. Cl.
CPC *F16H 9/04* (2013.01); *B60K 25/02* (2013.01); *F16D 27/105* (2013.01); *F16D 41/206* (2013.01); *F16D 47/04* (2013.01); *F02B 67/06* (2013.01); *F16H 55/36* (2013.01)

(58) Field of Classification Search
CPC ... F02B 67/06; F16H 55/36; F16H 61/66245; Y10T 74/1926; Y10T 74/1927
USPC .......................................................... 474/74
See application file for complete search history.

(56) References Cited

U.S. PATENT DOCUMENTS 444,341 A * 1/1891 Egg .................................. 474/74
463,703 A * 11/1891 Murdock ......................... 474/74
(Continued)

FOREIGN PATENT DOCUMENTS

CA 1172876 A1 8/1984
CA 1273504 A1 9/1990
(Continued)

OTHER PUBLICATIONS

PCT/CA2012/050235, Search Report Jun. 26, 2012.
(Continued)

*Primary Examiner* — Henry Liu
(74) *Attorney, Agent, or Firm* — Millman IP Inc.

(57) ABSTRACT

In a first aspect, the invention is directed to a multi-speed drive for controlling the speed of a load that is driven from a crankshaft of an engine. The multi-speed drive permits the speed of the load to be adjusted based on one or more parameters, such as vehicle speed, engine RPM, battery charge level (e.g. when the load is an alternator), coolant temperature (e.g. when the load is a cooling fan), engine power demand from the vehicle driver, water level in which the vehicle is driving (e.g. when the load is a cooling fan whose blades could be damaged or could cause damage to other vehicle components if they impact water during use). The speeds provided by the multi-speed drive may include two or more non-zero rotational speeds, or two or more non-zero rotational speeds and a zero speed, or one non-zero rotational speed and a zero speed.

10 Claims, 22 Drawing Sheets

(51) Int. Cl.
| | |
|---|---|
| F16H 61/00 | (2006.01) |
| F16H 63/00 | (2006.01) |
| F16H 9/04 | (2006.01) |
| B60K 25/02 | (2006.01) |
| F16D 27/105 | (2006.01) |
| F16D 41/20 | (2006.01) |
| F16D 47/04 | (2006.01) |
| F02B 67/06 | (2006.01) |
| F16H 55/36 | (2006.01) |

(56) References Cited

U.S. PATENT DOCUMENTS

| | | | | |
|---|---|---|---|---|
| 479,757 | A * | 7/1892 | Fruen | 474/74 |
| 486,687 | A * | 11/1892 | Swarthout | 474/74 |
| 510,502 | A * | 12/1893 | Erb | 474/74 |
| 538,287 | A * | 4/1895 | Scobee | 474/74 |
| 632,627 | A * | 9/1899 | Beaumont | 474/74 |
| 659,511 | A * | 10/1900 | Didierjean | 474/74 |
| 685,756 | A * | 11/1901 | Gifford | 474/74 |
| 707,012 | A * | 8/1902 | Rich | 474/74 |
| 1,080,642 | A | 12/1913 | MacFarland | |
| 1,140,132 | A | 5/1915 | Dorsey | |
| 1,235,046 | A | 7/1917 | Nikinow | |
| 1,608,141 | A * | 11/1926 | Shekerjian | 474/74 |
| 1,983,827 | A * | 12/1934 | Winther et al. | 74/336.5 |
| 2,230,293 | A * | 2/1941 | Harris | 474/70 |
| 2,463,100 | A * | 3/1949 | Gredell | 474/70 |
| 2,473,250 | A | 6/1949 | Hoffman | |
| 2,537,057 | A | 1/1951 | Hulman et al. | |
| 2,538,667 | A * | 1/1951 | Windsor | 474/70 |
| 2,641,137 | A * | 6/1953 | Orcutt et al. | 474/70 |
| 2,690,083 | A * | 9/1954 | Iseman | 475/212 |
| 2,694,937 | A * | 11/1954 | Birbaum | 74/336 R |
| 2,809,535 | A * | 10/1957 | Hein et al. | 477/12 |
| 2,866,349 | A * | 12/1958 | Heckethorn | 74/336 R |
| 2,885,896 | A * | 5/1959 | Hungerford, Jr. et al. | 474/70 |
| 2,886,977 | A * | 5/1959 | Ausdall | 474/70 |
| 2,911,961 | A * | 11/1959 | McRae | 123/41.11 |
| 2,911,962 | A * | 11/1959 | McRae | 123/41.11 |
| 2,945,482 | A * | 7/1960 | McRae | 123/41.11 |
| 2,955,478 | A * | 10/1960 | Davis | 74/336 R |
| 2,974,544 | A * | 3/1961 | Miner | 475/208 |
| 3,012,445 | A * | 12/1961 | Settimi et al. | 474/70 |
| 3,017,977 | A * | 1/1962 | Settimi et al. | 192/48.8 |
| 3,059,493 | A * | 10/1962 | Wolfram | 74/336.5 |
| 3,081,641 | A * | 3/1963 | Iseman | 474/70 |
| 3,082,647 | A | 3/1963 | Banker | |
| 3,124,968 | A * | 3/1964 | Trupp et al. | 474/74 |
| 3,270,207 | A | 8/1966 | Stockton | |
| 3,361,010 | A | 1/1968 | Miller | |
| 3,436,977 | A * | 4/1969 | Gredell | 474/70 |
| 3,444,748 | A * | 5/1969 | Sutaruk | 474/70 |
| 3,481,220 | A | 12/1969 | Kaptur | |
| 3,581,853 | A * | 6/1971 | Hoff | 192/218 |
| 3,610,062 | A * | 10/1971 | Hoff | 474/70 |
| 3,653,273 | A * | 4/1972 | Albertson et al. | 474/74 |
| 3,685,622 | A | 8/1972 | Baer et al. | |
| 3,884,089 | A * | 5/1975 | Avramidis | 474/70 |
| 4,080,843 | A * | 3/1978 | Underwood | 74/336 R |
| 4,276,037 | A * | 6/1981 | Ryan et al. | 474/70 |
| 4,296,717 | A * | 10/1981 | Schlagmuller | 123/195 A |
| 4,446,757 | A | 5/1984 | La Fever | |
| 4,501,575 | A * | 2/1985 | Lapeyre | 474/74 |
| 4,502,345 | A * | 3/1985 | Butterfield | 74/336 B |
| 4,571,216 | A * | 2/1986 | Stieg et al. | 474/8 |
| 4,589,303 | A | 5/1986 | Roberts | |
| 4,592,251 | A * | 6/1986 | Mason | 475/157 |
| 4,613,318 | A * | 9/1986 | McWilliam et al. | 474/74 |
| 4,667,537 | A | 5/1987 | Sivalingham | |
| 4,738,163 | A * | 4/1988 | Anderson et al. | 475/321 |
| 4,862,009 | A | 8/1989 | King | |
| 4,969,857 | A * | 11/1990 | Kumm | 474/49 |
| 5,017,180 | A * | 5/1991 | Berkeley | 474/84 |
| 5,139,469 | A * | 8/1992 | Hennessey et al. | 482/52 |
| 5,176,581 | A * | 1/1993 | Kumm | 474/110 |
| 5,378,210 | A | 1/1995 | Teraoka | |
| 5,418,400 | A | 5/1995 | Stockton | |
| 5,700,212 | A * | 12/1997 | Meckstroth | 474/70 |
| 5,826,549 | A * | 10/1998 | Martin | 123/41.11 |
| 5,827,143 | A * | 10/1998 | Monahan et al. | 474/73 |
| 5,842,944 | A | 12/1998 | Morishita et al. | |
| 6,071,206 | A * | 6/2000 | Monahan et al. | 475/154 |
| 6,079,385 | A * | 6/2000 | Wicke | 123/198 R |
| 6,306,057 | B1 | 10/2001 | Morisawa et al. | |
| 6,371,877 | B1 | 4/2002 | Schroeder et al. | |
| 6,832,970 | B2 | 12/2004 | Eibler | |
| 6,929,574 | B2 * | 8/2005 | Laufenberg et al. | 474/70 |
| 6,955,141 | B2 | 10/2005 | Santanam et al. | |
| 7,028,794 | B2 | 4/2006 | Odahara et al. | |
| 7,086,981 | B2 * | 8/2006 | Ali et al. | 475/210 |
| 7,448,972 | B2 * | 11/2008 | Garabello et al. | 474/74 |
| 7,757,830 | B2 * | 7/2010 | Boffelli | 192/48.2 |
| 7,798,928 | B2 * | 9/2010 | Serkh | 474/70 |
| 2002/0096133 | A1 * | 7/2002 | McGovern et al. | 123/41.48 |
| 2002/0183147 | A1 * | 12/2002 | Fujiwara | 474/70 |
| 2003/0051960 | A1 | 3/2003 | Li et al. | |
| 2003/0085091 | A1 | 5/2003 | Ichihara et al. | |
| 2004/0038769 | A1 | 2/2004 | Eibler | |
| 2004/0180742 | A1 * | 9/2004 | Ichihara et al. | 474/70 |
| 2005/0003916 | A1 * | 1/2005 | Miyata | 474/148 |
| 2005/0148417 | A1 * | 7/2005 | Garabello et al. | 474/70 |
| 2005/0153813 | A1 * | 7/2005 | Serkh | 475/324 |
| 2005/0181905 | A1 * | 8/2005 | Ali et al. | 475/210 |
| 2005/0215366 | A1 * | 9/2005 | Serkh | 474/74 |
| 2008/0153638 | A1 * | 6/2008 | Serkh | 474/74 |
| 2009/0176608 | A1 | 7/2009 | Jansen et al. | |
| 2009/0298646 | A1 * | 12/2009 | Parsons | 477/167 |
| 2010/0120563 | A1 * | 5/2010 | Serkh et al. | 474/74 |
| 2010/0122882 | A1 | 5/2010 | Komorowski et al. | |
| 2011/0112742 | A1 | 5/2011 | Losano et al. | |
| 2011/0124450 | A1 * | 5/2011 | Yang | 474/70 |

FOREIGN PATENT DOCUMENTS

| | | |
|---|---|---|
| CA | 2397181 A1 | 11/2001 |
| EP | 0384808 A1 | 8/1990 |
| JP | 63275434 A | 11/1988 |
| JP | 04321850 A | 11/1992 |
| WO | 2004018904 A1 | 3/2004 |
| WO | 2005071819 A1 | 8/2005 |
| WO | 2005083305 A1 | 9/2005 |
| WO | 2005103527 A1 | 11/2005 |
| WO | 2007108887 A1 | 9/2007 |
| WO | 2007116220 A1 | 10/2007 |
| WO | 2010054487 A1 | 5/2010 |
| WO | 2012024790 A2 | 3/2012 |

OTHER PUBLICATIONS

Warner Electric PC-500 (specification sheet), Jan. 17, 2008, Warner Electric, LLC.
Elastogran CCF Foam—Vehicle Vibration Damping Applications, Jul. 2011, BASF.
Written Opinion for PCT/CA2012/050235, Jun. 26, 2012, ISA.
International Preliminary Report on Patentability for PCA/CA2012/050235, Nov. 15, 2013, ISA.
Warner Electric PC-500 Clutch, Unknown, Warner Electric, LLC.
Agricultural Equipment Clutch—Dimensions (P-996), Unknown, Warner Electric, LLC.
Kysor—On-Off Pneumatic Truck Cooling Fan Clutch, Unknown, BorgWarner.
Horton—On-Off Pneumatic Truck Cooling Fan Clutch, Unknown, Horton Holding Inc.
1st Office Action and Search Report, Chinese Patent Application 201280018071.3 (Chinese version).
1st Office Action and Search Report, Chinese Patent Application 201280018071.3 (English version).

* cited by examiner

MULTI-SPEED DRIVE FOR TRANSFERRING POWER TO A LOAD

CROSS REFERENCE TO RELATED APPLICATIONS

This application is a national phase entry application of PCT/CA2012/050235, filed Apr. 11, 2012, which claims the benefit of: U.S. Provisional Application No. 61/474,253, filed Apr. 11, 2011.

FIELD OF THE INVENTION

The present invention relates to multi-speed drive systems for transferring power to an input shaft of a load (i.e. an accessory in a vehicle) such as an alternator, a cooling fan, a power steering pump, a vacuum pump, an air conditioning compressor, a hydraulic pump, or any other suitable kind of load, and more particularly to a multi-speed drive system for transferring power from a crankshaft of an engine to an input shaft of the load.

BACKGROUND OF THE INVENTION

Some multi-speed drive systems have been proposed for controlling the operative connection between an engine crankshaft in a vehicle, with an accessory in the vehicle. However, such systems have not succeeded in the marketplace for a variety of reasons. Such systems may be complex, unreliable, expensive and bulky, and may draw a significant amount of power for their operation. They may also be difficult to control and may be difficult to install.

It would be beneficial however to be able to provide a multi-speed system that is capable of driving an accessory and that at least partially addresses one or more of the aforementioned problems.

SUMMARY OF THE INVENTION

In a first aspect, the invention is directed to a multi-speed drive for controlling the speed of a load that is driven from a crankshaft of an engine. The multi-speed drive may drive any suitable type of load, such as a cooling fan for the engine, an alternator, a power steering pump, an air conditioning compressor, a vacuum pump, a hydraulic pump or any suitable load wherein the vehicle would benefit from being able to stop the rotation of the load when desired, or any suitable load wherein the vehicle would benefit from being able to provide a plurality of different speeds of rotation of the load. The multi-speed drive permits the speed of the load to be adjusted based on certain parameters, such as engine RPM, battery charge level (e.g. when the load is an alternator), coolant temperature (e.g. when the load is a cooling fan), engine power demand from the vehicle driver, water level in which the vehicle is driving (e.g. when the load is a cooling fan whose blades could be damaged or could cause damage to other vehicle components if they impact water during use). The speeds provided by the multi-speed drive may include two or more non-zero rotational speeds, or two or more non-zero rotational speeds and a zero speed, or one non-zero rotational speed and a zero speed. In some embodiments, both speeds are provided from a single source of power, such as an engine crankshaft. In other embodiments, the speeds are provided from different sources of power, such as an engine and a motor/generator unit (MGU).

In an embodiment of the first aspect, the invention is directed to a multi-speed drive for driving an input shaft of a load, which includes a first clutch system, a first clutch system input member, a second clutch system, and a second clutch system input member. The first clutch system includes an engagement clutch, a transfer member and a first overrunning clutch. The first clutch system input member, when operatively connected to the input shaft by the first clutch system, drives the input shaft to rotate at a first speed. The engagement clutch is positionable in a first position and in a second position. In the first position the engagement clutch operatively connects the first clutch system input member to the transfer member. In the second position the engagement clutch operatively disconnects the first clutch system input member from the transfer member. The first overrunning clutch is configured to permit the input shaft to rotate in a drive direction faster than the transfer member, and is configured to operatively connect the transfer member to the input shaft when the transfer member is rotating in the drive direction faster than the input shaft. The second clutch system includes a second overrunning clutch. The second clutch system input member, when operatively connected to the input shaft through the second clutch system, drives the input shaft to rotate at a second speed that is slower than the first speed. The second overrunning clutch is configured to permit the input shaft to rotate in the drive direction faster than the second clutch system input member, and is configured to operatively connect the second clutch system input member to the input shaft when the second clutch system input member is rotating in the drive direction faster than the input shaft. Such a system can provide at least two non-zero speeds for the input shaft of the load.

In another embodiment of the first aspect, the invention is directed to a multi-speed drive for driving an input shaft of a load, that includes a first clutch system, a first clutch system input member, a second clutch system and a second clutch system input member. The first clutch system includes an engagement clutch, a transfer member and a first overrunning clutch. The first clutch system input member, when operatively connected to the input shaft by the first clutch system, drives the input shaft to rotate at a first speed. The first engagement clutch is positionable in a first position and in a second position. In the first position the first engagement clutch operatively connects the first clutch system input member to the first transfer member. In the second position the first engagement clutch operatively disconnects the first clutch system input member from the first transfer member. The first overrunning clutch is configured to permit the input shaft to rotate in a drive direction faster than the first transfer member, and is configured to operatively connect the first transfer member to the input shaft when the first transfer member is rotating in the drive direction faster than the input shaft. The second clutch system includes a second engagement clutch, a second transfer member and a second overrunning clutch. The second clutch system input member is connectable to the input shaft for rotation at a second speed that is slower than the first speed. The second engagement clutch is positionable in a first position and in a second position. In the first position the second engagement clutch operatively connects the second clutch system input member to the second transfer member. In the second position the second engagement clutch operatively disconnects the second clutch system input member from the second transfer member. The second overrunning clutch is configured to permit the input shaft to rotate in the drive direction faster than the second transfer member, and is configured to operatively connect the second transfer member to the input shaft when the second transfer member is rotating in the drive direction faster than the input shaft.

Such a system can provide at least two non-zero speeds and a zero speed capability for the input shaft of the load.

In another embodiment of the first aspect, the invention is directed to a multi-speed drive for driving an input shaft of a fan, including a clutch system input member that is rotatable, a wrap spring and an actuation device. The wrap spring has a first end, a second end and a plurality of helical coils between the first end and the second end. The first end of the wrap spring is operatively engaged with one of the clutch system input member and the input shaft. The wrap spring is positionable in an engaged position wherein the wrap spring engages a radially inner surface of the other of the clutch system input member and the input shaft thereby rotationally operatively connecting the clutch system input member to the input shaft and a disengaged position wherein the wrap spring is retracted radially from the radially inner surface of the other of the clutch system input member and the input shaft thereby operatively disconnecting the clutch system input member from the input shaft. The actuation device is configured to cause the second end to move angularly relative to the first end so as to control the operative connection between the radially outer surface of the coils with said other of the transfer member and the first clutch system input member.

In an embodiment, the multi-speed drive includes first and second drive members mounted in association with a crankshaft from the engine, first and second driven members mounted in association with an input shaft of the load, endless drive elements transferring power from the drive members to the driven members, two overrunning clutches, and two engagement clutches. An engagement clutch and an overrunning clutch may be provided between each of the driven drive members and the input shaft. Alternatively, an engagement clutch and an overrunning clutch may be provided between each of the drive members and the crankshaft. Alternatively, the engagement clutches may be provided between the drive members and the crankshaft, and the overrunning clutches may be provided between the driven members and the input shaft. Other configurations will be apparent to one skilled in the art after reading this disclosure. In this embodiment, at least two non-zero speeds and a zero speed are provided. Other non-zero speeds could be provided via additional drive members with suitable clutch arrangements, and endless drive elements. If the drive members and driven members are gears, no endless drive elements would be needed.

Other embodiments similar to the embodiment described above are possible. In one other embodiment, there is no second engagement clutch provided on either of the second drive members. In such an embodiment, two non-zero speeds are provided, but no zero speed is provided (although more non-zero speeds can be provided by way of adding more drive members with suitable clutches and endless drive elements). In yet another embodiment, there is no second engagement clutch, no second drive members, no second endless drive element, and no first and second overrunning clutches. Thus there is a first drive member, a first driven member, a first endless drive element (if needed), and a first engagement clutch. In such an embodiment one non-zero speed and a zero speed are provided.

BRIEF DESCRIPTION OF THE DRAWINGS

The present invention will now be described, by way of example only, with reference to the attached drawings, in which.

DETAILED DESCRIPTION OF THE INVENTION

Figure 1:
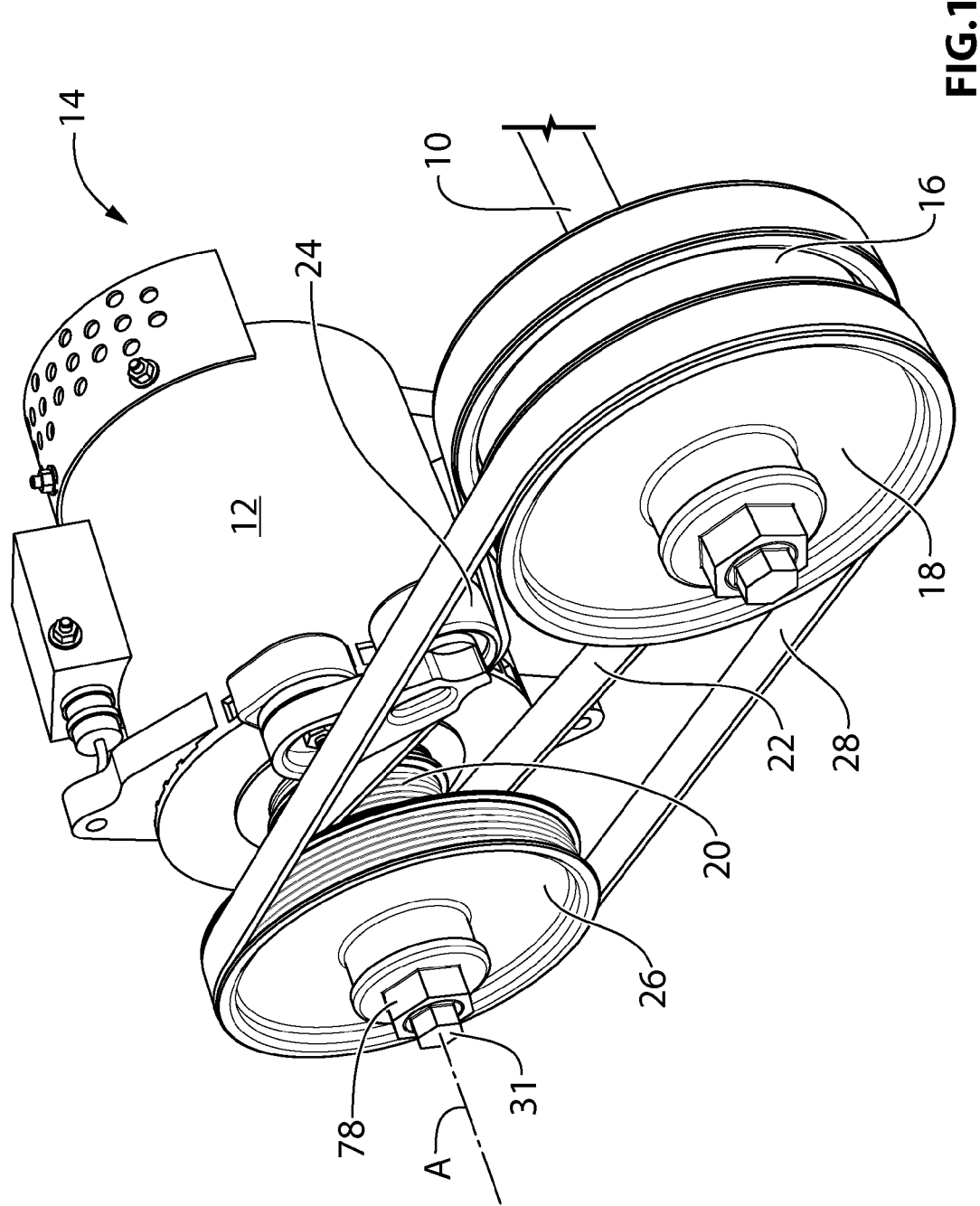
FIG. 1 is a perspective view of a multi-speed drive in accordance with an embodiment of the invention.
Figure 5:
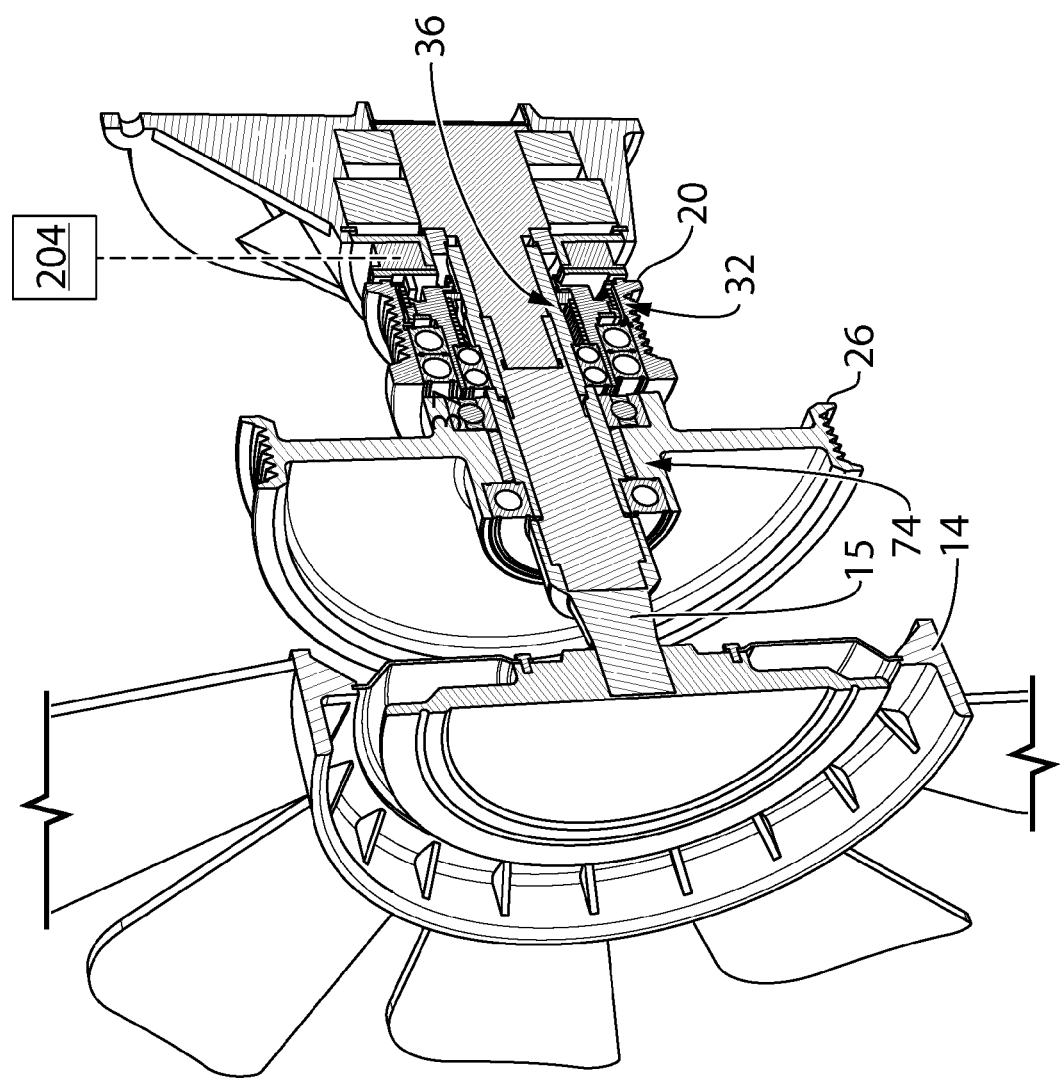
FIG. 5 is a perspective sectional view of the multi-speed drive shown in FIG. 1, shown with a fan.

Reference is made to FIG. 1, which shows a crankshaft 10 of an internal combustion engine (not shown), a load 12, and a multi-speed drive 14 for driving the load 12 from the engine crankshaft 10. In the embodiment shown in FIG. 1, the load 12 is an alternator, although, as noted above, the multi-speed drive 14 may be used to drive any other suitable loads 14, such as for example, a cooling fan for the engine, as shown in FIG. 5. The load 12 has an input shaft 15, which is rotatable about an axis A. The term 'accessory' may be used at times in place of the term 'load'.

The multi-speed drive 14 includes a first drive sheave 16 and a second drive sheave 18 both of which are mounted fixedly to the crankshaft 10.

The first drive sheave 16 drives a first driven sheave 20 via a first belt 22. A belt tensioner 24 is provided to maintain a selected belt tension in the belt 22.

The second drive sheave 18 drives a second driven sheave 26 via a second belt 28, which may be similar to the first belt 22.

Throughout this disclosure where a sheave is shown and described it will be understood that it is for illustrative purposes only. Any suitable drive member may be used in its place, including, for example, a sprocket or a gear. Similarly while belts are shown and described as connecting the sheaves, it will be understood that the belt could be replaced by any other suitable endless drive member such as a chain or a timing belt. In cases where gears are used instead of sheaves, no endless drive member would be necessary.

Figure 4:
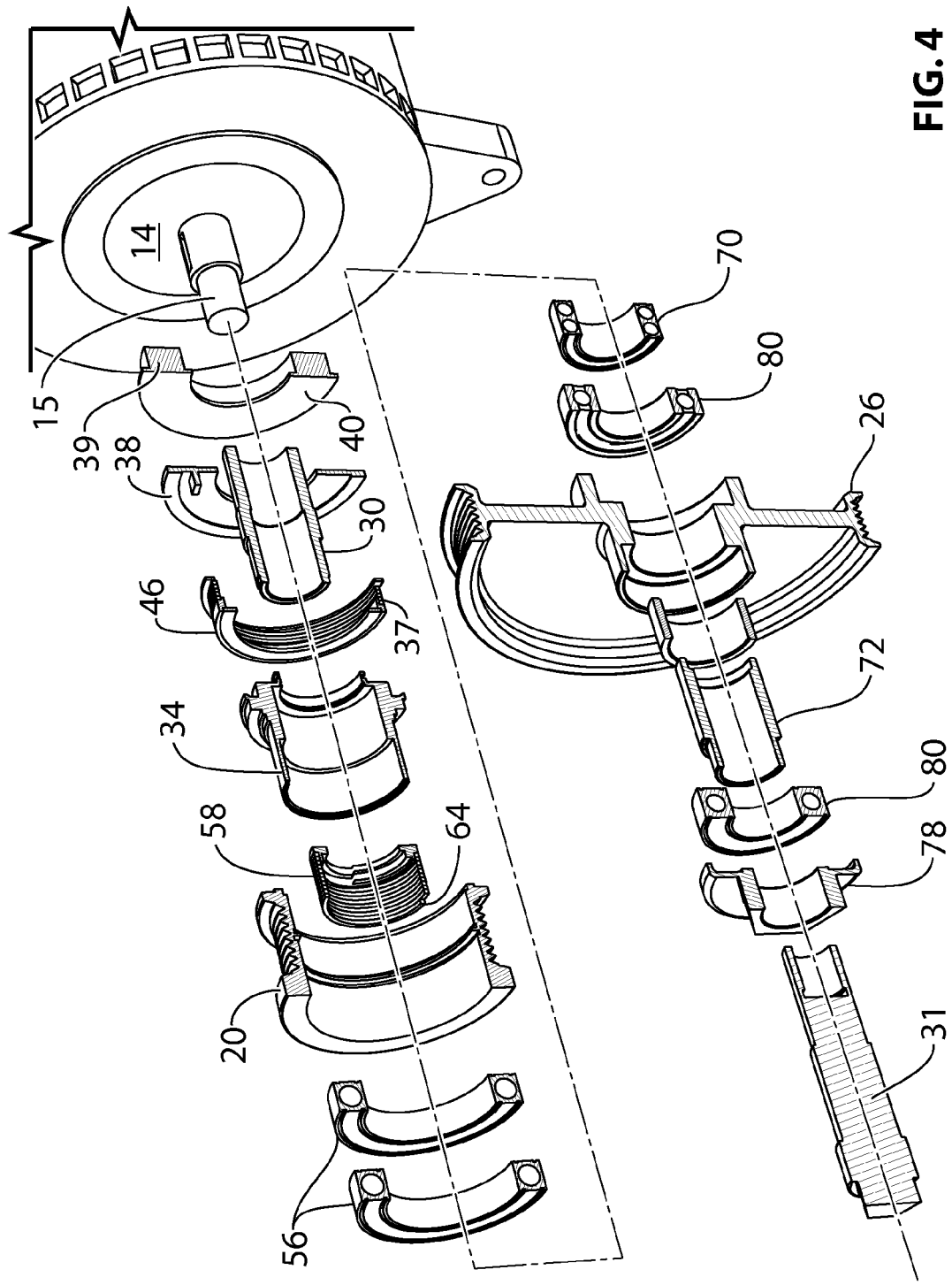
FIG. 4 is an exploded perspective view of a portion of the multi-speed drive shown in FIG. 1.

The components of the multi-speed drive 14 that are associated with the crankshaft 10, such as, for example, the first and second drive sheaves 16 and 18, may be referred to as the drive end of the multi-speed drive 14. The components of the multi-speed drive 14 that are associated with the input shaft 15, such as, for example, the first and second driven sheaves 20, and 26 and the mechanisms that operatively connect them to the input shaft 15, may be referred to as the driven end. These components are shown in an exploded view in FIG. 4.

Referring to FIG. 1, for simplicity the endless drive elements 22 and 28 may be referred to herein as belts. It will be understood that they may be any suitable type of endless drive element, however, including both ribbed and non-ribbed belts, for example.

Figure 2A:
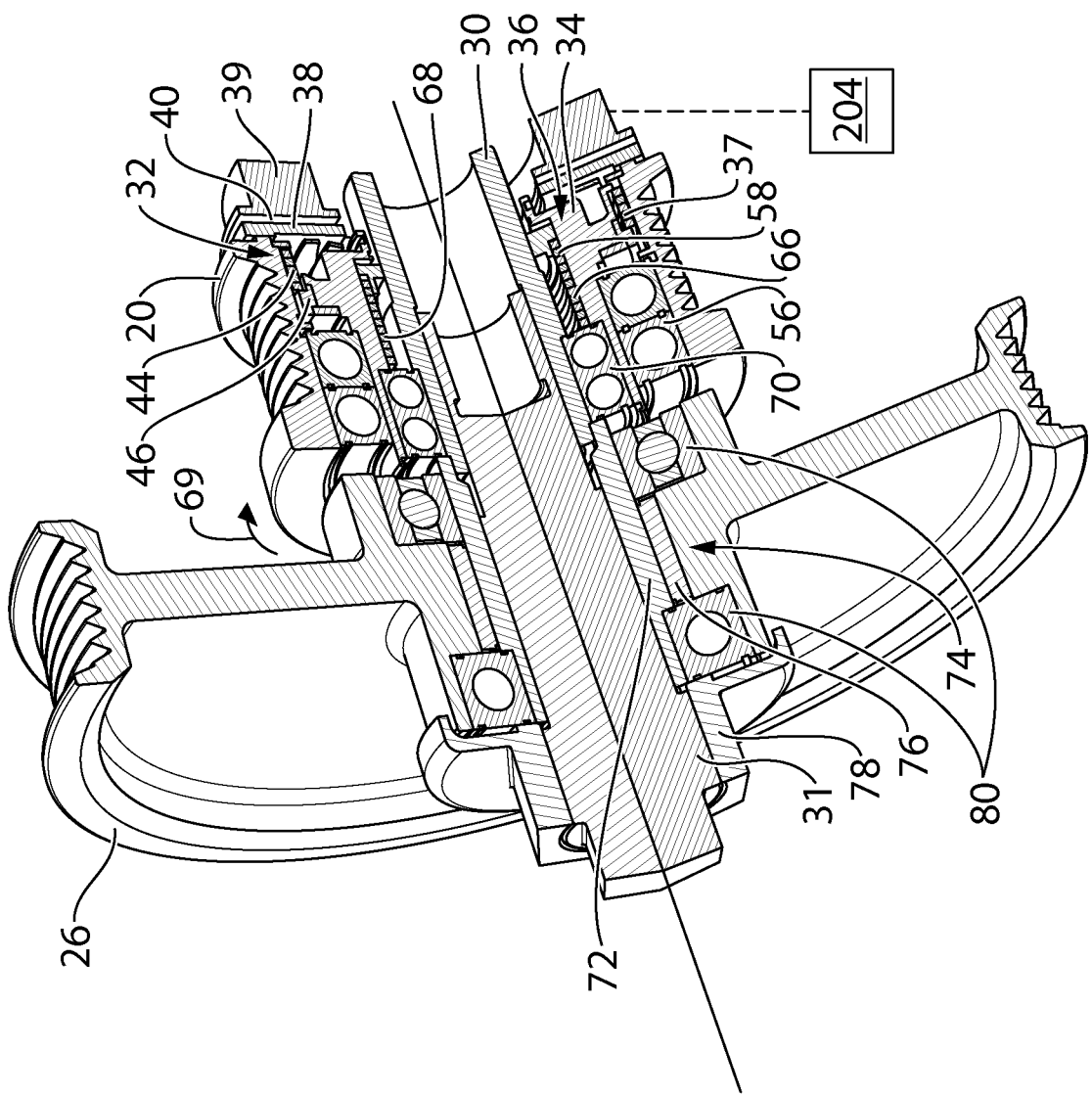
FIG. 2*a* is a perspective sectional view of a portion of the multi-speed drive shown in FIG. 1, with an armature in a first axial position.

Reference is made to FIG. 2a, which shows a sectional view of the driven end of the multi-speed drive 14 including the two driven sheaves 20 and 26. Based on the sheave diameter ratio between the first sheaves 16 and 20 the first driven sheave 20 is configured to be driven at a first speed about the axis A. Based on the sheave diameter ratio between the second sheaves 18 and 26, the second driven sheave 26 is configured to be driven at a second speed about the axis A. The first and second sheave diameter ratios are selected so that the second speed (i.e. the speed of the second driven sheave 26) is slower than the first speed (i.e. the speed of the first driven sheave 20). In the embodiment shown the first and second drive sheaves 16 and 18 have the same diameter, and the first driven sheave 20 has a smaller diameter than the second driven sheave 26.

A first shaft extension member 30 is shown, which fixedly mounts to the end of the input shaft 15, (e.g. via a keyed connection or any other suitable type of connection). A second shaft extension member 31 is also shown, which fixedly mounts to the first shaft extension member 30 (e.g. via an interference fit or any other suitable type of connection). Accordingly, the second shaft extension member 31 is also fixedly mounted to the input shaft 15, albeit indirectly via the first shaft extension. By way of the first and second shaft extensions, which effectively become one with the input shaft 15, the first and second sheaves are operatively connectable to the input shaft 15 and to the load 12.

The first driven sheave 20 is operatively connectable to the input shaft 15 through a first clutch system that includes an engagement clutch 32, a first transfer member 34 and a first overrunning clutch 36. As a result, the first driven sheave 20 may be referred to as a first clutch system input member.

The engagement clutch 32 is provided to control whether or not there is an operative connection between the first driven sheave 20 and the first transfer member 34, and is positionable in a sheave engagement position wherein the engagement clutch 32 operatively connects the first driven sheave 20 to the first transfer member 34 and in a sheave disengagement position wherein the engagement clutch 32 operatively disconnects the first driven sheave 20 from the first transfer member 34.

Figure 3A:
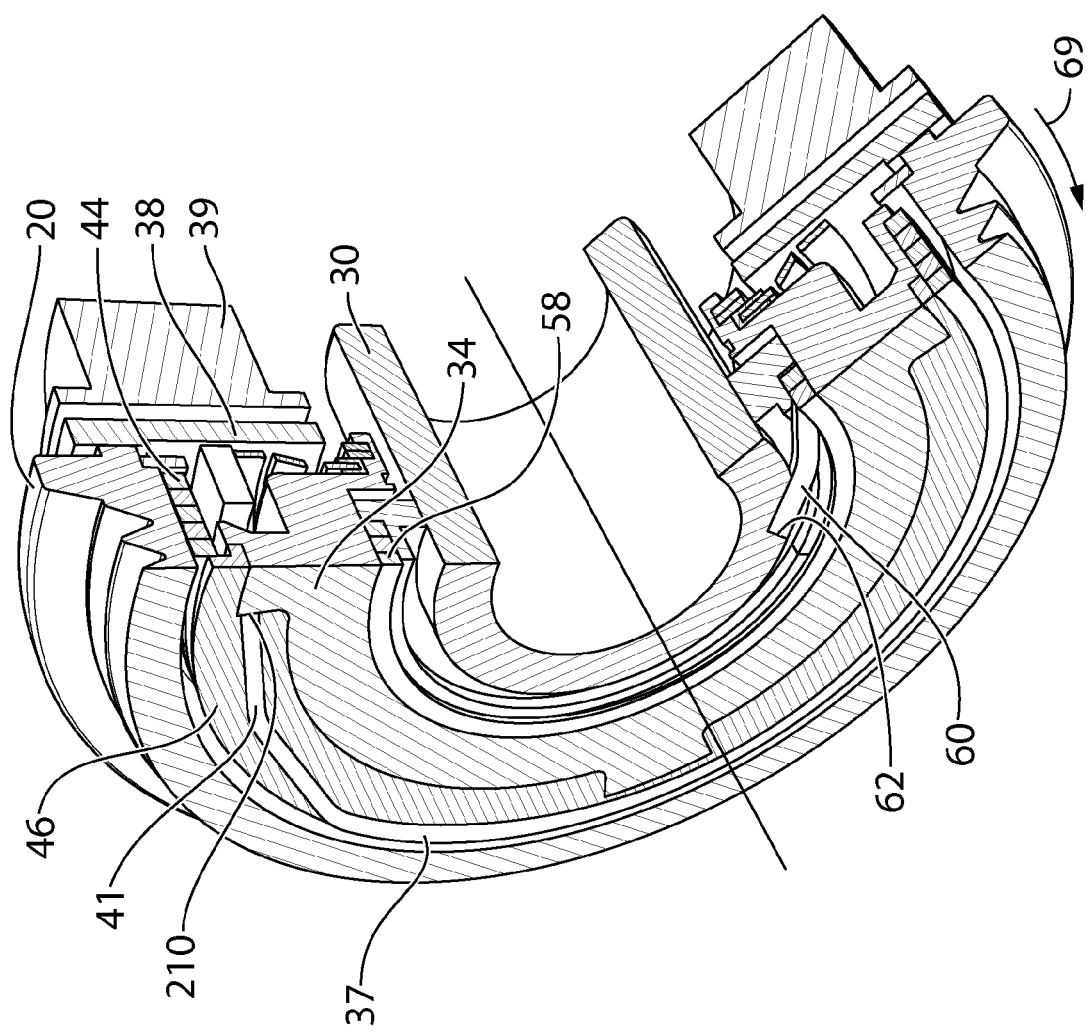
FIG. 3*a* is a perspective sectional view of the multi-speed drive shown in FIG. 1, with the armature in the first axial position.
Figure 3B:
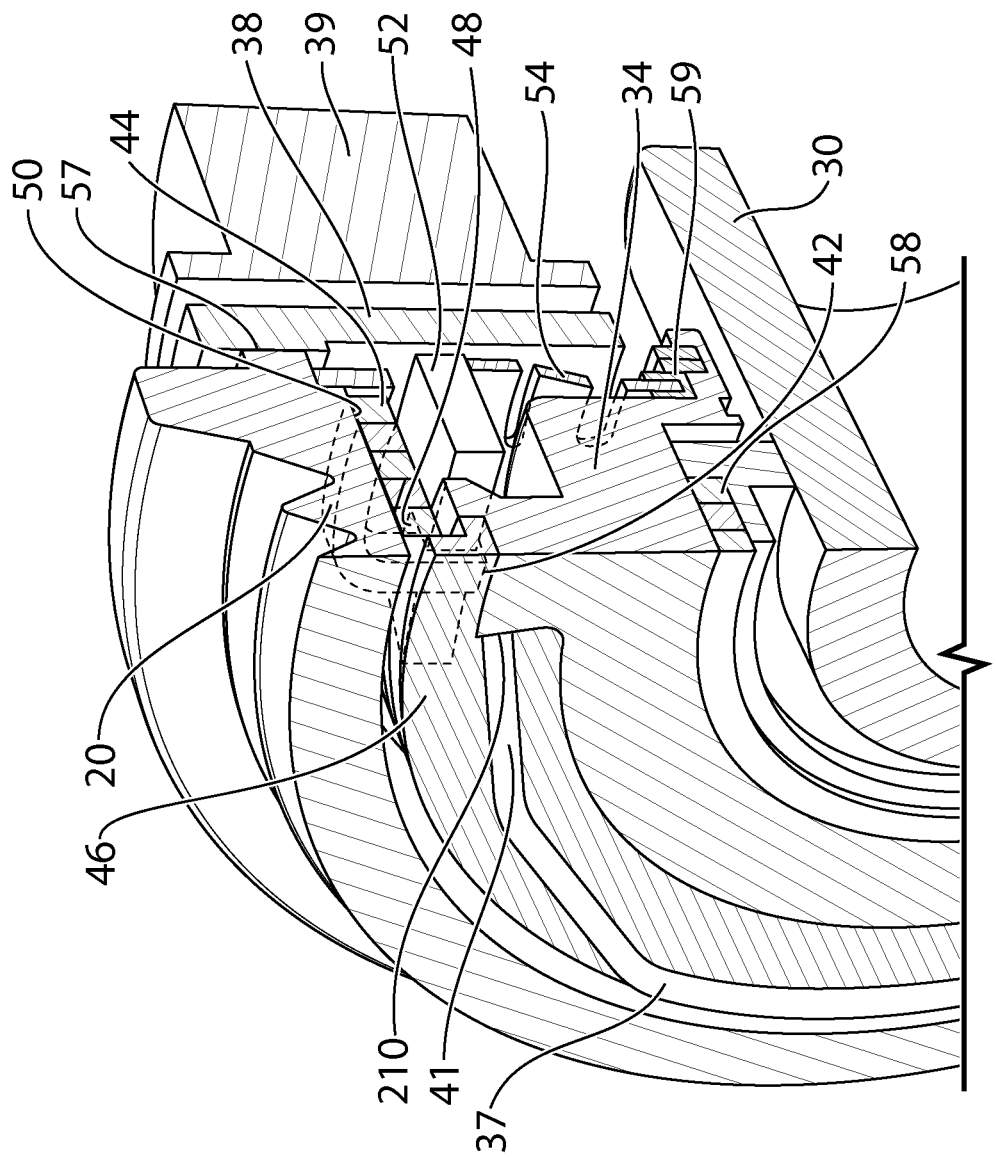
FIG. 3*b* is a magnified perspective sectional view of a portion of the multi-speed drive shown in FIG. 1, with the armature in the first axial position.

The engagement clutch 32 may be any suitable type of engagement clutch. In the embodiment shown the engagement clutch includes an engagement clutch wrap spring 37, an armature 38 and an electromagnetic unit 35 that includes an electromagnetic coil 39 and a electromagnetic coil housing 33 (which may be referred to simply as a coil housing). The engagement clutch wrap spring 37 has a first end 41 (FIG. 3a), a second end 42 (FIG. 3b) and a plurality of helical coils 44 that extend between the first and second ends 41 and 42. The engagement clutch wrap spring 37 is held in a carrier 46, which connects to the first transfer member 34 in such a way as to hold the first end 41 of the wrap spring 37 fixedly in abutment with a drive shoulder 210 on the first transfer member 34. As best shown in FIG. 3b, the second end 42 of the wrap spring 37 is held in a slot 48 in a driver 52 that is part of the armature 38 such that the armature 38 is rotatably operatively connected with the second end 42 of the wrap spring 37. For greater certainty, when a first object is 'rotationally operatively connected' to or with a second object, this means that the first object is capable of causing rotation in the second object, without limitation on whether or not the first object is capable of causing axial movement in the second object. Depending on how they are connected, the second object may also be capable of causing rotation in the first object; configurations where this is possible will be readily apparent from the description and figures.

The wrap spring 37 is positionable in a first position wherein the coils 44 are engaged with a radially inner surface 50 of the first driven sheave 20 (FIG. 2c), and in a second position wherein the coils 44 are retracted from the inner surface 50 of the sheave 20 (FIG. 3b). The wrap spring 37 is biased towards the first position by its own spring force which urges it towards a larger coil diameter than there is room for within the inner surface 50, so that unless it is retracted by some force away from the inner surface 50 it is by default engaged with the inner surface 50.

Figure 2B:
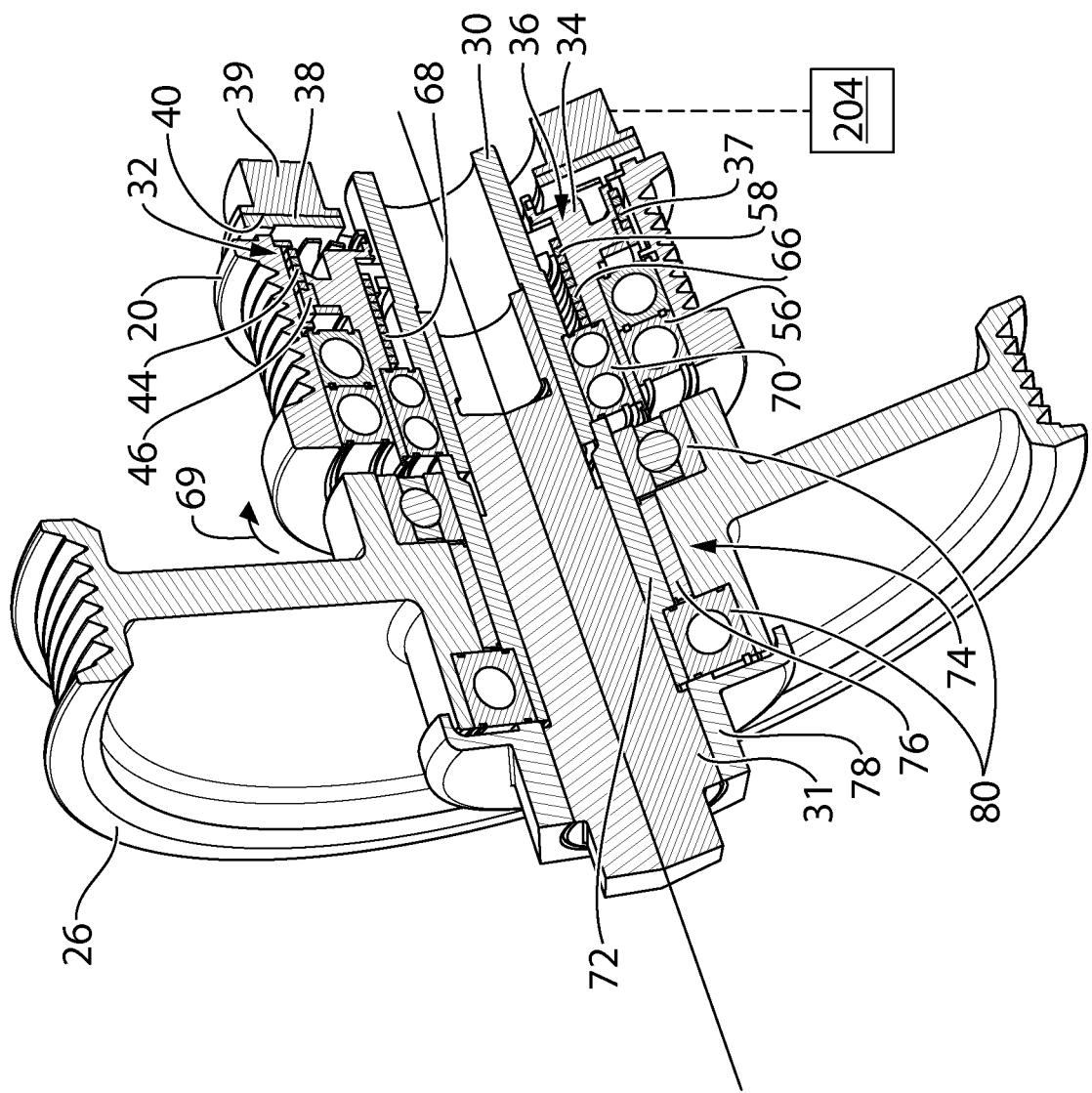
FIG. 2*b* is another perspective sectional view of the portion of the multi-speed drive shown in FIG. 2*a*, with the armature in a second axial position.
Figure 2C:
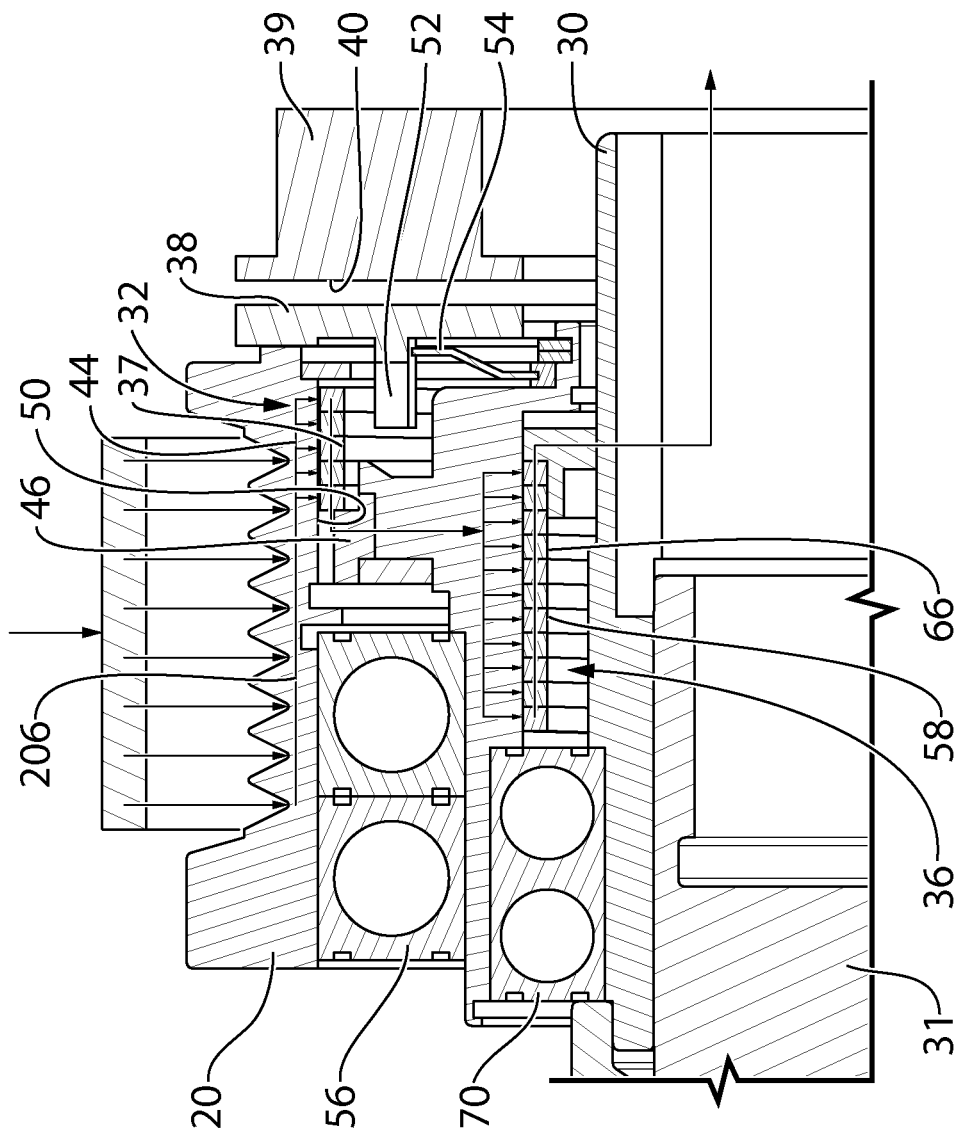
FIG. 2*c* is a magnified sectional side view of a portion of the multi-speed drive shown in FIG. 1, with the armature in the first axial position and illustrating a torque path through the drive.
Figure 2D:
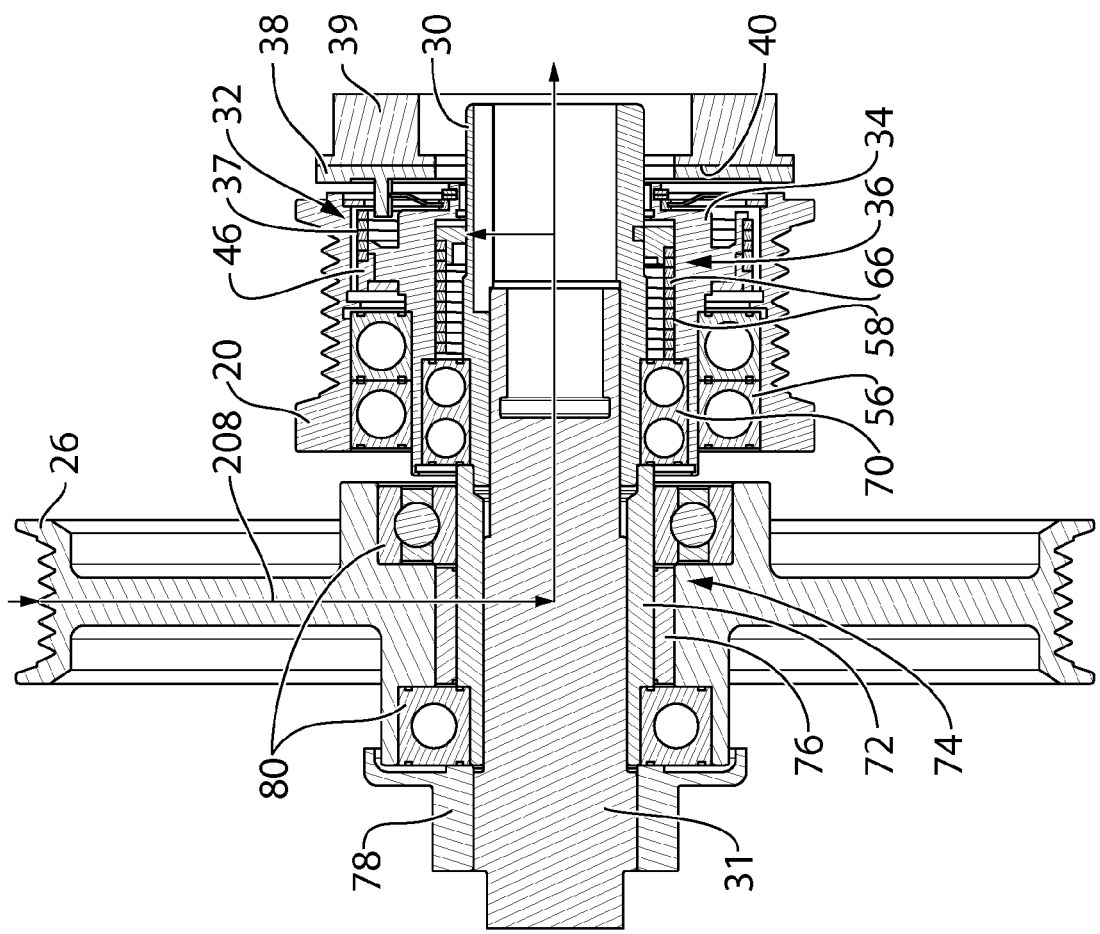
FIG. 2*d* is a sectional side view of a portion of the multi-speed drive shown in FIG. 1, with the armature in the second axial position, and illustrating a different torque path through the drive.

The armature 38 is slidable between a first axial position (FIGS. 2a and 2c) and a second axial position (FIGS. 2b and 2d). When in the first axial position (FIGS. 2a and 2c) the armature 38 is axially spaced from the friction surface 40 and thus rotates freely with the first transfer member 34. Energization of the electromagnetic coil 39 draws the armature 38 to the second axial position (FIGS. 2b and 2d) whereat the armature 38 is engaged with a stationary friction surface 40. In the embodiment shown the friction surface 40 is on a housing of the electromagnetic coil however it could be on any stationary member. Engagement with the friction surface 40 while the armature 38 is rotating causes the armature 38 to decelerate. Deceleration of the armature 38 causes the second end 42 of the wrap spring 38 to rotate angularly away from the first end 41 which causes the coils 44 to retract out of engagement with the first driven sheave 20. Once the coils 44 are unengaged with the first driven sheave 20, the engagement between the armature 38 and the friction surface 40 brings the armature 38 and consequently the first transfer member 34 rotationally to a stop. A suitable configuration of an engagement clutch is shown in PCT patent application publication WO2010/054487, which is hereby incorporated by reference.

It will be noted that, while the surface 40 is referred to as a friction surface 40, it is only a friction surface in the sense that its engagement with the armature 38 causes deceleration of the armature 38. The surface 40 need not necessarily have a particularly high friction coefficient for this purpose. It could be for example, that the mating surface of the armature 38 has a higher friction coefficient. It could be, for example that neither surface has a particularly high coefficient of friction while still causing enough drag on the armature 38 to retract the coils 44 from the sheave 20. The friction surface 40 may be referred to as a disengagement friction surface, as it is used in the disengagement of the wrap spring 37 of the first driven sheave 20.

A spring 54 biases the armature 38 towards the first position, and therefore the default position of the armature 38 is the first position which operatively connects the first driven sheave 20 to the first transfer member 34. One end of the spring 54 may be fixedly connected to the armature 38, while the other end is fixed axially to the first transfer member 34 but is captured in a sleeve member 59 (which may be referred to as bushing 59), which permits it to slide rotationally relative to the first transfer member 34. Another friction surface shown at 57 may be provided on the first driven sheave 20 to assist in holding the armature 38 (and therefore the second end 42 of the wrap spring 44) at a particular angular position relative to the first end 41 of the wrap spring 37 so as to inhibit the inadvertent angular displacement of the second end 42 of the wrap spring which could inadvertently cause momentary disengagement of the wrap spring 37 from the inner surface 50.

A set of bearings 56 supports the first driven sheave 20 on the first transfer member 34 permitting the first driven sheave 20 to rotate relative to the first transfer member 34 when the first transfer member 34 is stopped by energization of the electromagnetic coil 40.

The first overrunning clutch 36 may be any suitable type of clutch. For example, the first overrunning clutch 36 may be a one-way wrap spring-type clutch that includes a first overrunning clutch wrap spring 58 that has a first end 60 that is abuttable with a drive shoulder 62 on the first shaft extension member 30 as shown in FIG. 3a. The wrap spring 58 has a second end 64 (FIG. 4) that may be free, and a plurality of helical coils 66 which are engageable with a radially inner surface 68 of the first transfer member 34. The wrap spring 58 is configured such that when the first transfer member 34 rotates in a drive direction shown at 69 faster than the first shaft extension 30 (and thus faster than the input shaft 15), the friction between the first transfer member 34 and the wrap spring 58 drives the first end 60 into abutment with the drive shoulder 62, which in turn causes the coils 66 of the wrap spring 60 to expand radially further into frictional engagement with the first transfer member 34. As a result, the first transfer member 34 is operatively connected to the input shaft 15. The drive direction 69 is the direction in which the belt 22 drives the first driven sheave 20.

Instead of being a wrap spring clutch, the first overrunning clutch 36 may be any other suitable type of clutch, such as a sprag clutch, a roller clutch, a needle roller clutch, a diode clutch or any other suitable type of clutch.

When the input shaft 15 (and therefore the first shaft extension 30) rotates in the drive direction 69 faster than the first transfer member 34, the first end 60 of the wrap spring 58 is pulled away from engagement with the drive shoulder 62. Thus the wrap spring 58 is not driven to expand into engagement with the first transfer member 34. As a result, the input shaft 15 and the first transfer member 34 are operatively disconnected from each other. Thus when the first transfer member 34 is stationary (e.g. during energization of the electromagnetic coil 39) the input shaft 15 is free to rotate in the drive direction 69 (e.g. by being driven from the second driven sheave 26).

A bearing 70 supports the first transfer member 34 on the first shaft extension 30 and permits the relative rotation between the input shaft 15 and the first transfer member 34.

The second driven sheave 26 is mounted on a base 72, which is itself mounted fixedly to the second shaft extension 31. The second driven sheave 26 is operatively connectable to the input shaft 15 through a second clutch system including a second overrunning clutch 74. As a result, the second driven sheave 26 may be referred to as a second clutch system input member.

The second overrunning clutch 74 may be any suitable type of clutch. For example, the second overrunning clutch 74 may be a roller type clutch as shown in FIGS. 2a and 2b, a one-way wrap spring clutch, a sprag clutch, a needle roller clutch, a diode clutch or any other suitable type of clutch.

The second overrunning clutch 74 is configured such that when the second driven sheave 26 rotates in the drive direction 69 faster than the second shaft extension 31 (and thus faster than the input shaft 15), the rollers (shown at 76) wedge, which operatively connects the second driven sheave 26 to the input shaft 15. However, when the input shaft 15 (and thus the second shaft extension 31) rotates faster than the second driven sheave 26 in the drive direction 69, the rollers 76 instead operatively disconnect the input shaft 15 and the second driven sheave 26 from each other.

A set of bearings 80 supports the second driven sheave 26 on the base 72 permitting relative rotation of the sheave 26 and the input shaft 15 relative to each other.

An end fastener 78 mounts to the end of the second shaft extension 31 to hold the components associated with the first and second driven sheaves 20 and 26 on the first and second shaft extensions 30 and 31.

Referring to FIG. 1 it can be seen that when the crankshaft 10 of the engine is rotating, the first and second driven sheaves 20 and 26 rotate by virtue of the direct connection between them and the first and second drive sheaves 16 and 18 via the endless drive elements, with the first driven sheave 20 rotating at the first (high) speed and with the second driven sheave 26 rotating at the second (low) speed. When it is desired to rotate the load 12 at the high speed, the electromagnetic coil 39 is not energized, and thus the armature 38 is in its first position so that the first driven sheave 20 is operatively connected to the first transfer member 34. As a result, the first transfer member 34 is driven to rotate at the speed of the first driven sheave 20 (i.e. the high speed). If the input shaft 15 is rotating at a slower speed than the high speed, the input shaft 15 is accelerated by the first transfer member 34 to the high speed via the first overrunning clutch 36. While this takes place, the second driven sheave 26 continues to be driven at the second (low) speed. Thus the input shaft 15 rotates faster than the second driven sheave 26, which is permitted by the second overrunning clutch 74. The high speed torque flow path between the multi-speed drive 14 and the input shaft 15 is shown at 206 in FIG. 2c.

When it is desired to change the speed of rotation of the input shaft 15 from high speed to low speed, the electromagnetic coil 39 is energized, so as to stop the first transfer member 34 and operatively disengage the first driven sheave 20 from the first transfer member 34. As a result the input shaft 15 will decelerate from the high speed. While the input shaft 15 is rotating faster than the second driven sheave 26, the second overrunning clutch 74 prevents an operative connection between them in the drive direction. Once the input shaft 15 slows down to a point just below the speed of the second driven sheave 26, the overrunning clutch 74 provides an operative connection from the second drive sheave 26 to the input shaft 15. Thus, the input shaft 15 is maintained at the second speed. The low speed torque flow path between the multi-speed drive 14 and the input shaft 15 is shown at 208 in FIG. 2d.

The components involved in driving the input shaft 15 at the higher speed (e.g. the first drive sheave 16, the first driven sheave 20, the first belt 22, the engagement clutch 32 the first transfer member 34 and the first overrunning clutch 36) make up a first drive, which in this instance may also be referred to as a high speed drive. The components involved in driving the input shaft 15 at the higher speed (e.g. the first drive sheave 16, the first driven sheave 20, the first belt 22, and the second overrunning clutch 74) make up a second drive, which in this instance may also be referred to as a low speed drive.

Providing a two-speed drive 14 as shown in FIGS. 2a and 2b is advantageous in many situations. For example, in an embodiment wherein the load 12 is an alternator, driving the input shaft 15 using the high speed driven sheave (i.e. first driven sheave 20) permits a suitable rotational speed on the alternator for charging the vehicle's battery even when the engine is turning at relatively low RPM. Thus, for vehicles that idle for long periods, such as police cruisers, tow trucks, taxis and the like, the RPM of the engine at idle is still sufficient to charge the vehicle's battery at a suitable rate. However, when the engine's RPM is higher, such as during highway driving, driving the input shaft 15 using the high speed sheave 20 can cause premature wear on any bearings and other elements that are part of, or in contact with the load 12 and input shaft 15. Thus, when the engine RPM increases beyond a selected RPM, the two-speed drive 14 can be switched from driving the input shaft 15 with the high speed driven sheave 20 to driving the input shaft 15 with the low speed driven sheave 26, which still provides a suitable RPM on the load 12 to sufficiently charge the battery while reducing the amount of wear on any bearings and other elements that are part of, or in contact with the load 12.

Figure 10:
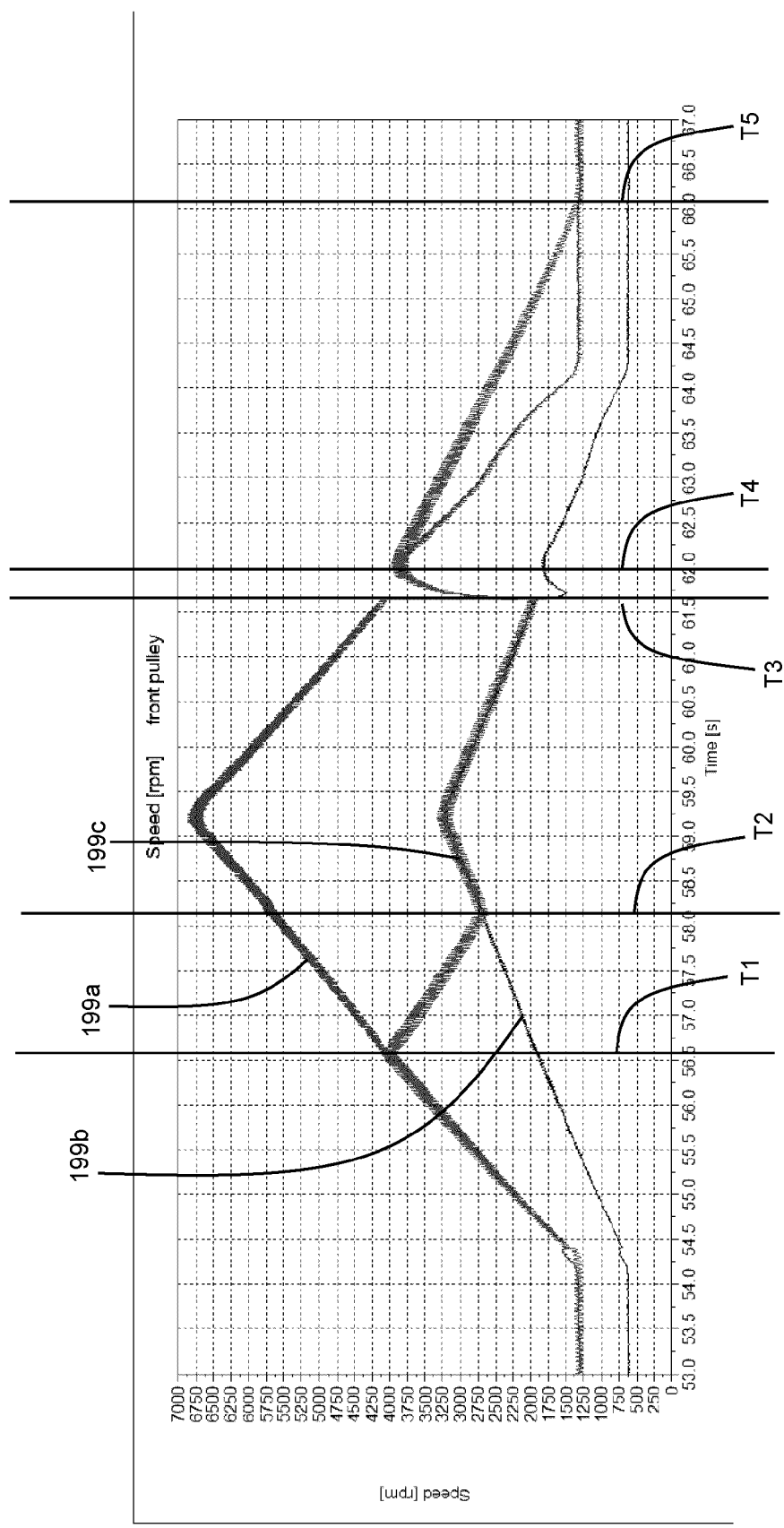
FIG. 10 is a graph illustrating the performance of a multi-speed drive similar to that shown in FIG. 1.

A test setup of a multi-speed drive similar to that shown in FIGS. 2a-3b was operated, with some output data shown in the graph in FIG. 10. The graph shows three curves 199a, 199b and 199c which relate to the speed (in RPM) of the first driven sheave 20, the second driven sheave 26 and the input shaft 15 respectively. Initially, the engagement clutch 32 is engaged such that the input shaft 15 rotates at the speed of the first driven sheave 20 (i.e. the higher speed). As the engine RPMs rise, at time T1 the controller 204 energizes the coil 39 to disengage the clutch 32. As a result, the speed of the input shaft 15 gradually drops until it reaches the speed of the second driven sheave 26, at time T2. At that point the speed of the input shaft 15 is controlled by the speed of the second driven sheave 26. The engine RPM peaks and then drops and at time T3 the controller 204 reengages the clutch 32 (i.e. by deenergizing the coil 39). At that point the speed of the input shaft 15 is brought up to the speed of the first driven sheave 20 and reaches it at time T4. It can be seen that after this point, the speed of sheave 20 is dropping (with the RPM of the engine during this phase of the test) and the inertia in the accessory causes the input shaft 15 to overrun the first driven sheave 20 for a period, until time T5 when it drops down due to friction to match the speed of the first driven sheave 20.

In another embodiment shown in FIG. 5, the load 12 may be a fan. Providing the two-speed drive 14 where the load 12 is a fan is advantageous in many situations. For situations in which the engine is at low RPM, but the fan is needed to cool the engine coolant, the input shaft 15 may be driven via the high speed driven sheave 20 so that the fan speed is relatively high even though the engine speed is relatively low. This can be advantageous in situations, for example, where the vehicle is stuck in traffic for long periods of time (and is therefore at relatively low engine speed), on a very hot day (which increases the temperature of the engine coolant). This can be even more advantageous in such a situation wherein the vehicular load is high (as occurs, for example, when the vehicle is towing a trailer, or a boat, or the like or some other towing load). In other situations (which may be the larger fraction of the total driving time of the vehicle), high speed operation of the fan is not necessary to keep the engine coolant sufficiently cool. In such situations the electromagnetic coil 39 could be controlled so as to reduce the fan speed to a low speed, which robs the engine of less power than driving the fan at high speed. Thus, when the fan speed is low the engine effectively has more power available for tasks such as acceleration.

In any of the embodiments described above, it may be that the operation of the electromagnetic coil 39 is controlled autonomously by a controller 204 based on one or more inputs (e.g. engine RPM, battery charge level). In some of the embodiments, however, the operation of the electromagnetic coil 39 could be controlled in part by the vehicle's driver via a dashboard mounted switch (not shown), and in part by the controller 204. For example, if the driver would like additional power from the engine, the driver could press a switch to command the two-speed drive 14 to drive the fan at a low speed. However, a controller 204 could override the driver's command based on the engine coolant temperature or based on other factors.

Figure 11A:
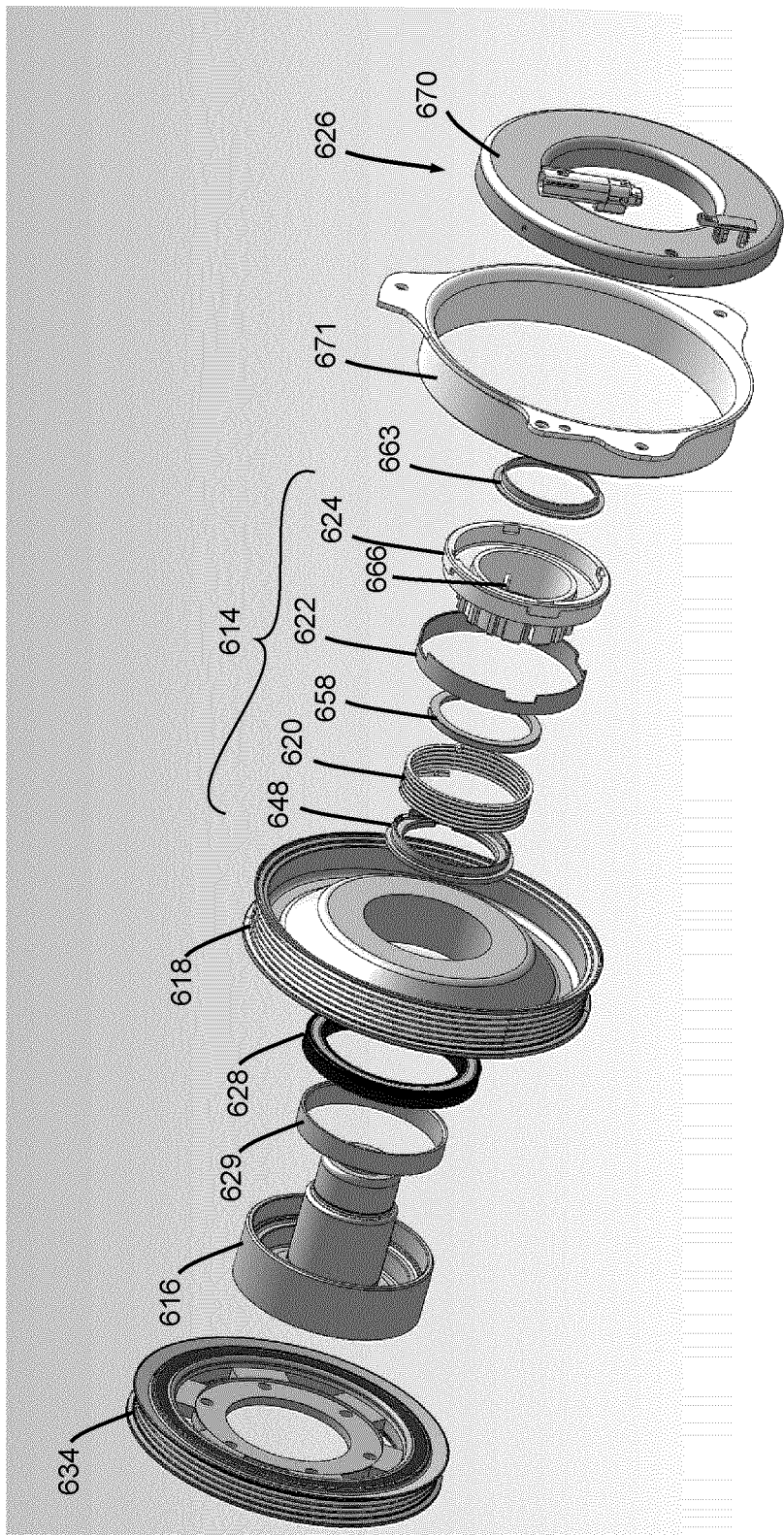
FIG. 11*a* is an exploded perspective view of a portion of a multi-speed drive in accordance with another embodiment of the invention.
Figure 11B:
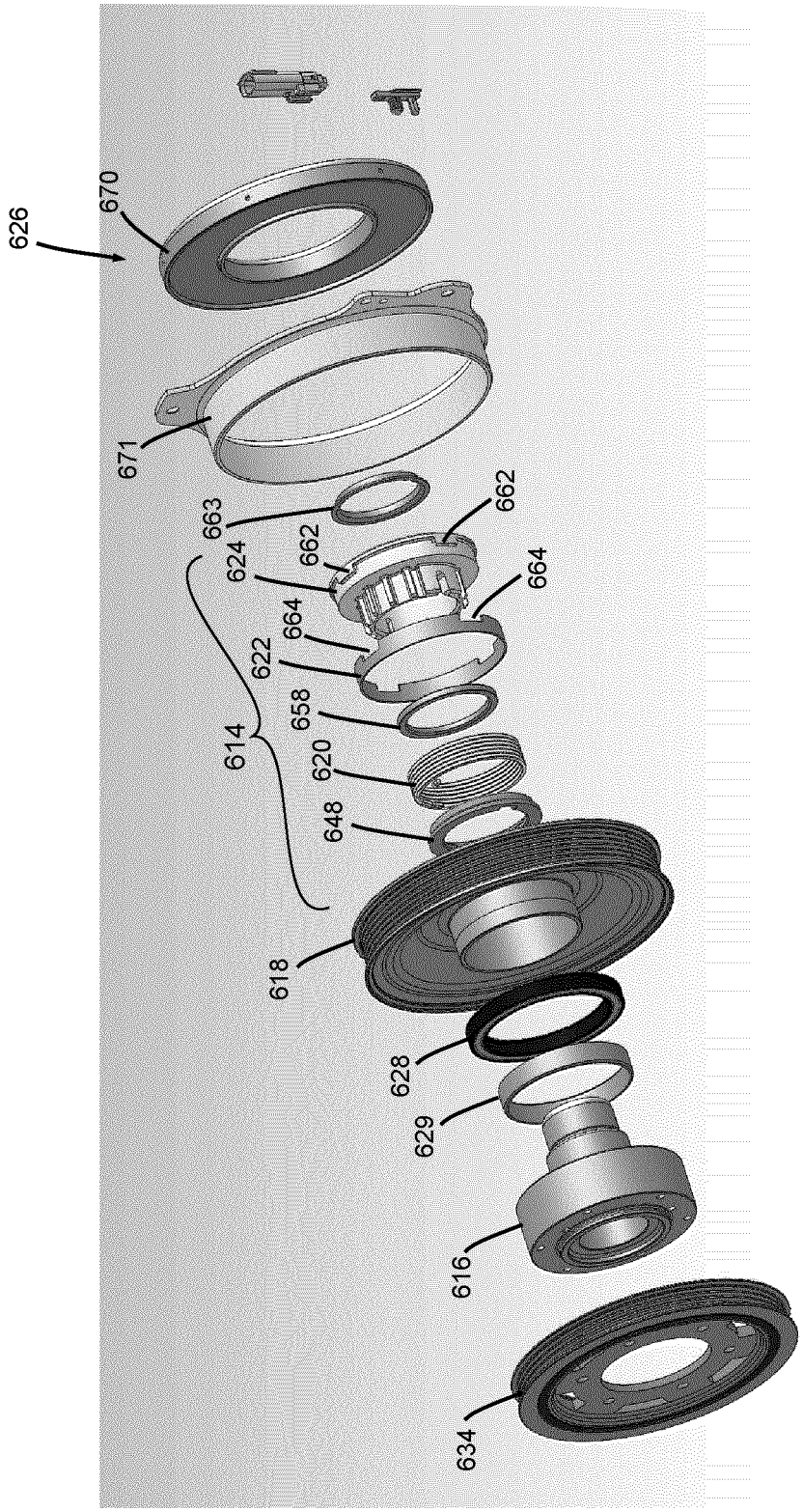
FIG. 11*b* is another exploded perspective view of the portion of the multi-speed drive shown in FIG. 11*a*.

While it has been shown to provide the engagement clutch 32 in the first driven sheave 20 it is alternatively possible to provide the engagement clutch 32 in the drive sheave 16. The drive end of a multi-speed drive 600 in accordance with such an embodiment is shown in FIGS. 11a-13c. Referring to FIGS. 11a and 11b, the multi-speed drive 600 includes first and second drive sheaves 618 and 634, which drive first and second driven sheaves, both of which may be substantially identical to the driven sheave 26 shown in FIG. 11a in the sense that they may each be connected to the input shaft 15 through a one-way clutch, which may optionally be similar to one-way clutch 74 (FIG. 11a). The two driven sheaves may however have different diameters. The multi-speed drive 600 further includes an engagement clutch 614 in the first drive sheave 618. The engagement clutch 614 includes a wrap spring 620, an armature 622, an actuator 624 and an electromagnetic unit 626. The engagement clutch 614 is advantageous in that it can be constructed from relatively few components, and is usable to selectively connect the crankshaft 10 to the accessory using very low power.

Figure 12A:
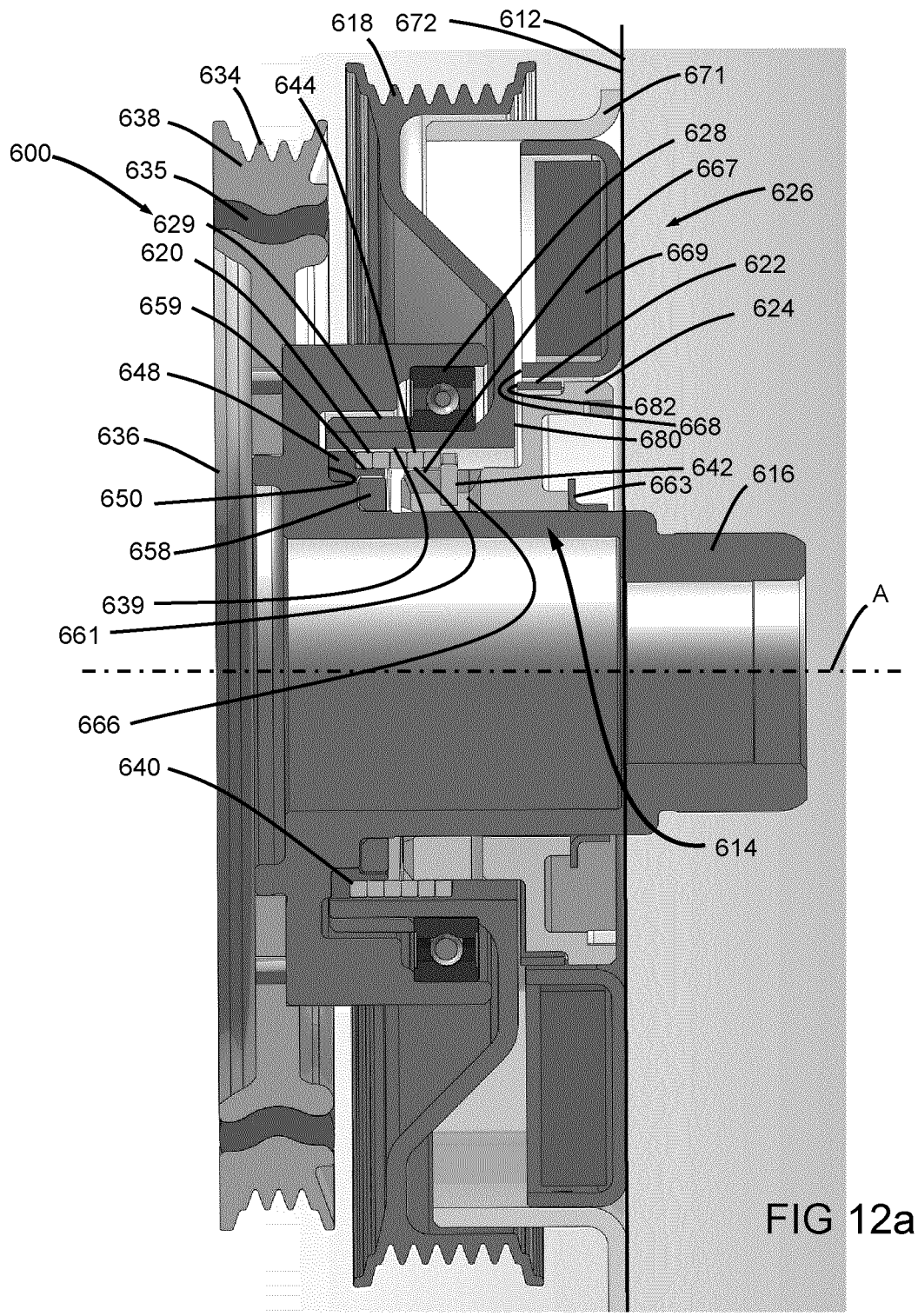
FIG. 12*a* is a sectional side view of a portion of the multi-speed drive shown in FIG. 11*a*, with an engagement clutch in an unengaged position.
Figure 12B:
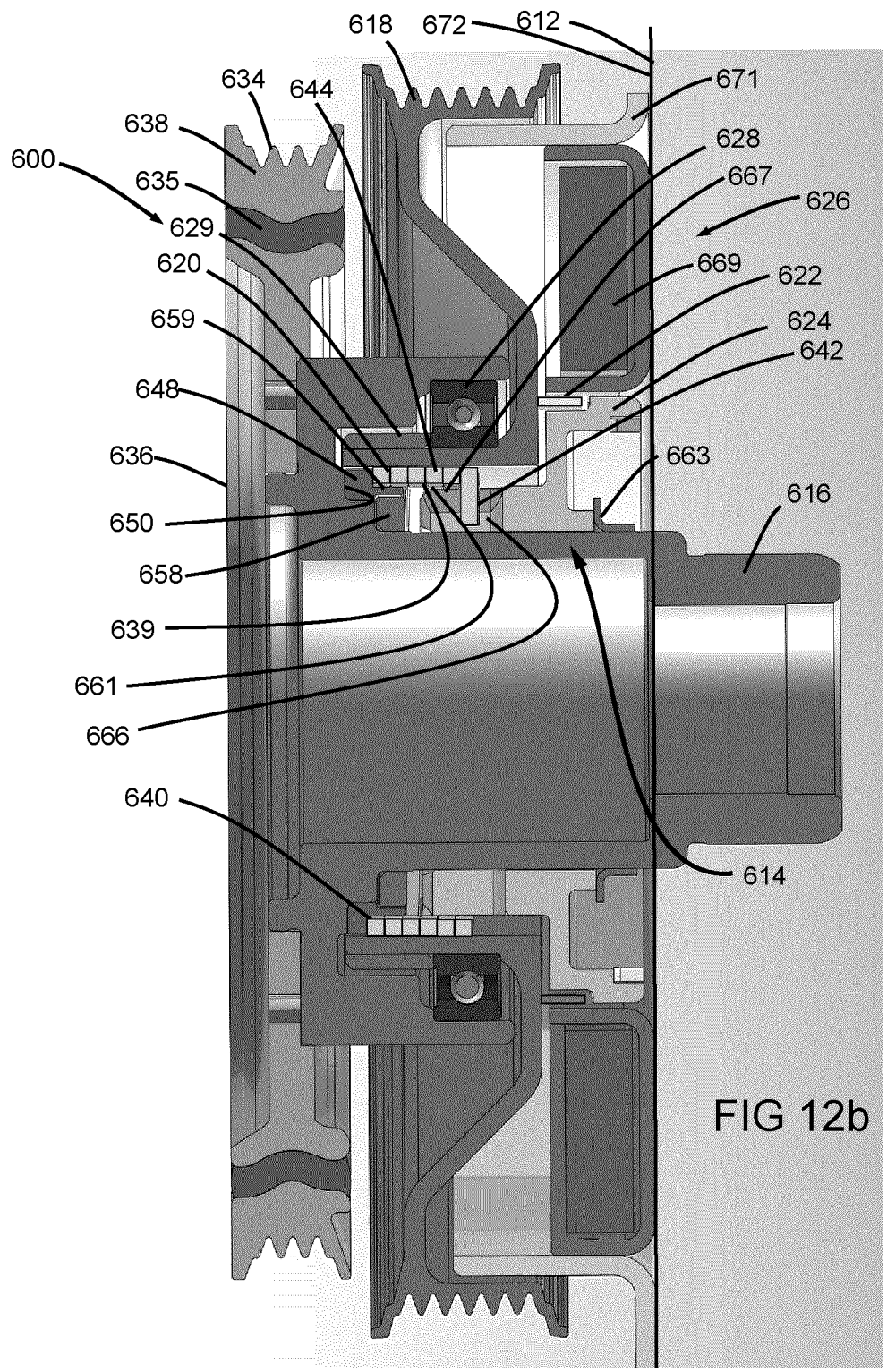
FIG. 12*b* is a sectional side view of the portion of the multi-speed drive shown in FIG. 12*a*, with the engagement clutch in an engaged position.

The engagement clutch 614 is movable from a disengaged position shown in FIG. 12a to an engaged position shown in FIG. 12b by transmission of a magnetic flux from the electromagnetic unit 626 through the first drive sheave 618, the armature 622 and back into the electromagnetic unit 626. The engagement clutch 614 may be referred to as being engaged when it in the engaged position and may be referred to as being disengaged or unengaged when it is in the disengaged position.

The crankshaft extension 616 is driven by the crankshaft 10 and in the embodiment shown in FIG. 11a it mounts to the crankshaft 10. The crankshaft extension 616 may be made from any suitable material, such as a suitable steel.

The first drive sheave 618 is driven by the crankshaft extension 616 when the engagement clutch 614 is engaged (FIG. 12b), and may be idle when the engagement clutch 614 is disengaged (FIG. 12a). The first drive sheave 618 may be rotatably supported on the crankshaft extension 616 by means of one or more bearing members 628. In the embodiment shown there is a single bearing member 628 provided, which is a ball bearing, which is held on the first drive sheave 618 by means of a bearing retainer 29 that is fixedly mounted to the first drive sheave 618 (e.g. by way of a press-fit).

The first and second drive sheaves 618 and 634 could each alternatively be any other suitable power transfer element such as a gear that engages one or more gears that ultimately drive the accessory, or a sprocket that drives a chain that ultimately drives the accessory.

The first drive sheave 618 may be made from a material that has at least a selected permeability so that it has at least a selected capability to transfer a magnetic flux, such as a 1010 steel. It will be noted that it is not important for the first drive sheave 618 to be made from a material having a particularly high magnetic permeability, or a particularly low magnetic permeability. The magnetic permeability of the crankshaft extension 616 is not important, at least in the embodiment shown in FIG. 11a.

This second drive sheave 634 may include a means for damping torsional vibration that may be generated at the crankshaft 10 (a by-product of the operation of many, if not all, internal combustion engines). For example, the second drive sheave 634 may include a rubber damping element 635 therein, between an inner portion 636 of the second drive sheave 634 and an outer portion 638 of the second drive sheave 634. In some embodiments, the second drive sheave 634 may be replaced by a torsional vibration damping disc that is not intended to drive any components, but is there only to dampen torsional vibrations from the engine shown at 612.

The wrap spring 620 is movable between a disengaged position shown in FIG. 3a and an engaged position shown in FIG. 12b. In the disengaged position the wrap spring 620 is unengaged with the first drive sheave 618 and crankshaft extension 616 is operatively disconnected with the first drive sheave 618 (i.e. the engagement clutch 614 is disengaged). In the engaged position the wrap spring 620 is radially expanded into engagement with a radially inner surface shown at 639 of the first drive sheave 618, thereby operatively connecting the crankshaft extension 616 to the first drive sheave 618 (i.e. the engagement clutch 614 is engaged).

The wrap spring 620 has a first end 640 (shown best in FIG. 13a), a second end 642 (shown best in FIG. 13b) and a plurality of helical coils 644 between the first end 640 and the second end 642. The crankshaft extension 616 is rotationally operatively connected with the first end 640 of the wrap spring 620. The first end 640 of the wrap spring 620 may be held in a groove 646 (FIG. 13b) in a carrier shown at 648.

The carrier 648 in general assists in maintaining a predetermined shape to the wrap spring 620, and assists the wrap spring 620 in resisting undesired deformation particularly during periods in which the wrap spring 620 is transferring high torque from the crankshaft extension 616 to the first drive sheave 618.

The carrier 648 may be made any suitable material, such as a plastic material, or alternatively a metallic material.

Figure 13A:
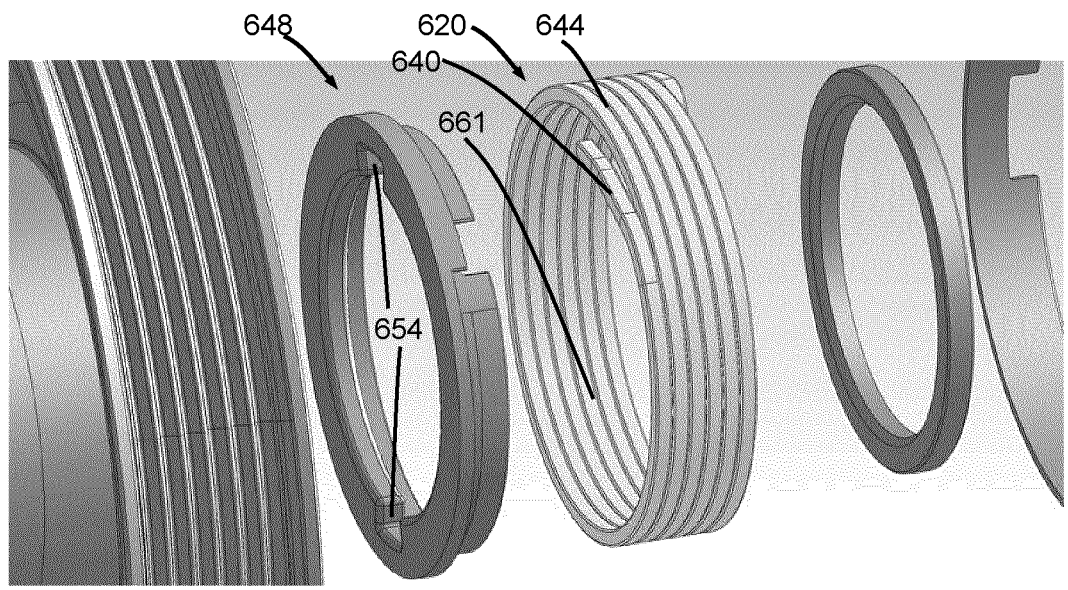
FIGS. 13*a*, 13*b* and 13*c* are magnified perspective exploded views of portions of the engagement clutch shown in FIGS. 11*a* and 11*b*.
Figure 13B:
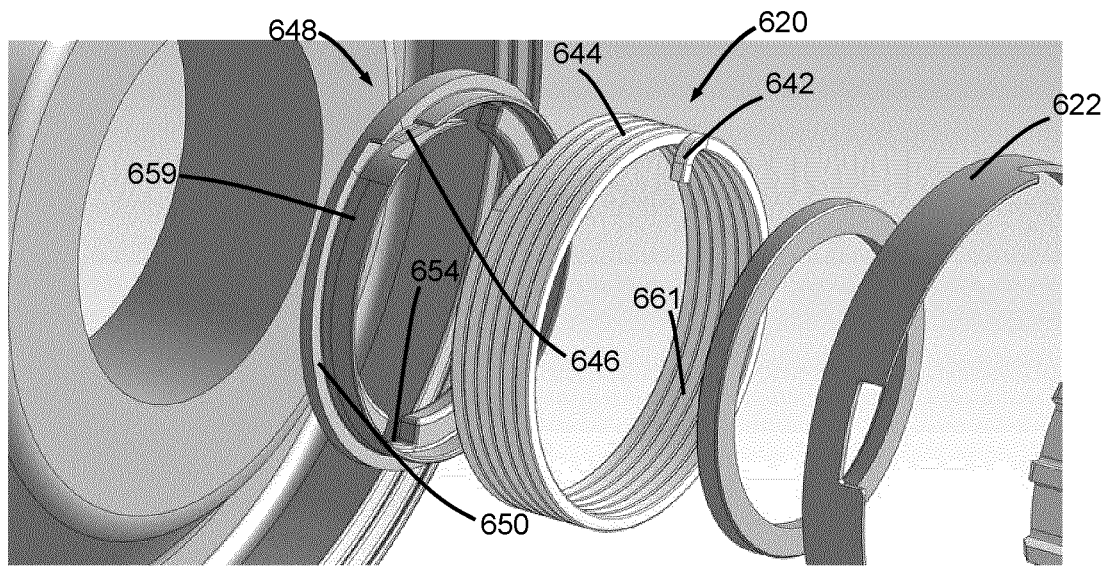
Figure 13C:
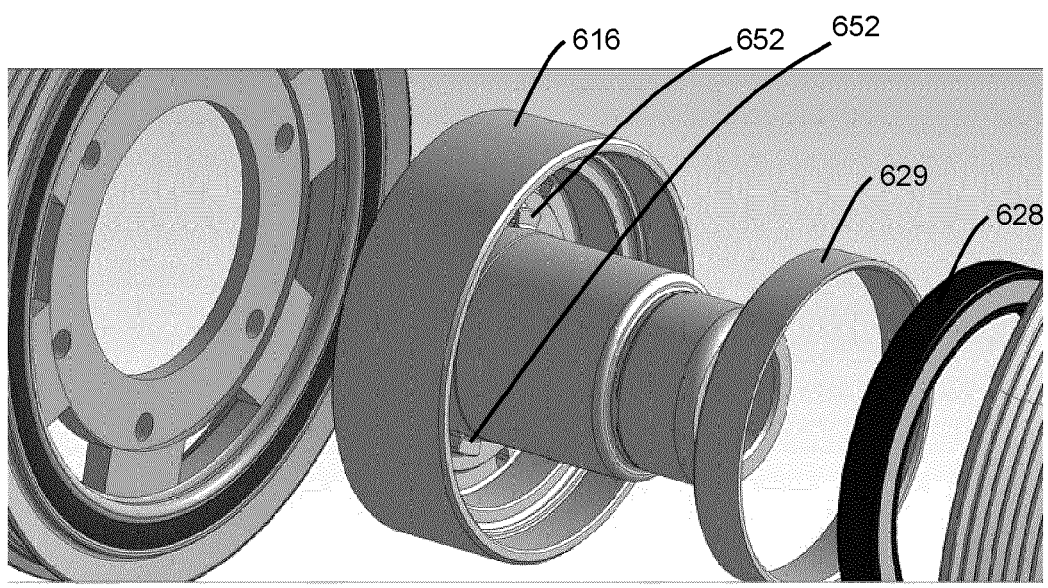

Referring to FIG. 13a, the carrier 648 is held in a carrier seat 50 in the crankshaft extension 616. The carrier 648 is driven rotationally about the axis A by the crankshaft extension 616 by means of engagement between a plurality of lugs 652 (shown in FIG. 13c) on the crankshaft extension 616 and a plurality of lug slots 654 on the carrier 648. While two lugs 652 and lug slots 654 are shown, in some embodiments a single lug 652 and a single lug slot 654 could be provided, or three or more lugs 652 and lug slots 654 could be provided. Instead of providing lugs 652 on the crankshaft extension 616 and lug slots 654 on the carrier 648, the lugs 652 could be on the carrier 648 and the lug slots 654 could be on the crankshaft extension 616.

The carrier 648 further includes a retainer engagement surface 56. As shown in FIG. 12a, a retainer 58 that is press-fit onto the crankshaft extension 616 engages the retainer engagement surface 56 and holds the carrier 648 in place against the carrier seat 50.

Referring to FIG. 13a, the carrier 648 further includes a wrap spring seat 50 on which the wrap spring 620 rests. The wrap spring seat 50 terminates in the groove 46. The groove 46 ends at one of the lug slots 654 so that the first end 640 of the wrap spring 620 directly engages one of the lugs 652. As a result, the crankshaft extension 616 does not drive the wrap spring 620 through the carrier 648, but instead drives the first end 640 of the wrap spring 620 directly. This is advantageous in that the tip of the first end 640 of the wrap spring 620 directly abuts (and is driven by) a metallic surface (i.e. the lug 652) instead of abutting and being driven by material from the carrier 648, which may be softer than the material of the crankshaft extension 616 and which may be prone to deformation by the tip of the first end 640 during periods of high torque transfer.

The carrier 648 further includes a first portion 659 of a wrap spring support surface 660 that extends axially. The first portion 659 of the surface 660 supports a portion of the radially inner surface (shown at 661) of the wrap spring 620 (FIG. 12a).

The actuator 624 is mounted on the crankshaft extension 616 in such a way that there is rotational slippage possible between them. An actuator retainer 63 is fixedly mounted to the crankshaft extension 616 to prevent axial withdrawal away from an axial position relative to the first drive sheave 618. In an embodiment, the actuator 624 may be made from a material that is at least in some embodiments non-magnetic, such as Nylon 4-6 that is modified to include Teflon™, or alternatively aluminum (which may be pure aluminum or an aluminum alloy). The actuator 624 supports the armature 622 in such a way that the armature 622 is movable axially thereon but such that the armature 622 is rotationally operatively connected to the actuator 624. For greater certainty, when a first object is 'rotationally operatively connected' to or with a second object, this means that the first object is capable of causing rotation in the second object, without limitation on whether or not the first object is capable of causing axial movement in the second object. Depending on how they are connected, the second object may also be capable of causing rotation in the first object; configurations where this is possible will be readily apparent from the description and figures. The actuator 624 need not be made from a non-magnetic material. In some embodiments it may be made from a material that has less than a selected permeability. In other embodiments it may have a relatively high permeability while being separated from the electromagnetic unit housing 670 by a suitable insulative air gap or by some magnetically insulative material.

As shown in FIG. 11b, this rotational operative connection may be achieved by providing one or more lugs 662 on the actuator 624 and one or more lug slots 664 on the armature 622. While the lugs 662 and lug slots 664 permit the actuator 624 and the armature 622 to drive each other rotationally, they permit the armature 622 to slide axially between a first position shown in FIG. 3a, and a second position shown in FIG. 12b. The first and second positions of the armature 622 are described in further detail, further below.

Referring to FIGS. 12a and 12b and 11a, the actuator 624 further includes a drive slot 66 that receives the second end 642 of the wrap spring 620, thereby fixing the actuator 624 rotationally to the second end 642 of the wrap spring 620. As a result, the armature 622 is also rotationally operatively connected with the second end 642 of the wrap spring 620. Thus it can be said that there is an operative connection between the armature 622 and the second end 642 of the wrap spring 620. It can be seen that the crankshaft extension 616 is operatively connected to the armature for rotation about the axis A, as a result of the operative connection between the crankshaft extension 616 and the first end 640 of the wrap spring 620 and the operative connection between the second end 642 of the wrap spring 620 and the actuator 624 and therefore the armature 622.

It will be noted that the actuator 624 has thereon another portion 667 of the wrap spring support surface 660, which that supports another portion of the radially inner surface 661 of the wrap spring 620 (FIG. 12a). Together the first and second portions 659 and 667 may make up some or all of the wrap spring support surface 660. The wrap spring support surface 660 has a selected radius that is larger than a free state radius of the wrap spring 620, so as to generate a selected amount of preload into the wrap spring 620 when the wrap spring is supported thereon. In other words, if the wrap spring 620 were permitted to, it would radially contract to a free state having a radius that is smaller than the radius of the wrap spring support surface 660. As a result, the wrap spring 620 is under some tension (i.e. it is preloaded by some amount) even when it rests on the wrap spring support surface 660. This preload causes the wrap spring 620 to engage the support surface 660 with a certain amount of force.

During use, when the crankshaft extension 616 rotates and the engagement clutch 614 is disengaged centrifugal forces act on the wrap spring 620 from the speed of rotation itself and urge it to radially expand. Additionally, during use, the engine 12 (FIG. 11a) may undergo relatively strong accelerations (i.e. ramp-ups in engine speed) during, for example, aggressive driving maneuvers or during transmission downshifts, or even resulting from torsional vibration from the engine 12. These accelerations may momentarily urge the first end 640 of the wrap spring 620 away from the second end 642 in a selected circumferential direction that urges the wrap spring 620 to radially expend. If the wrap spring 620 had no preload in it, substantially any force urging it to radially expand would result in at least some amount of radial expansion of the wrap spring 620 away from the support surface 660. This can result in noise when the wrap spring 620 re-contacts the support surface 660 after the force causing it to expand is removed or reduced. Also, if the force was sufficiently strong, the wrap spring 620 could expand by a sufficient amount to momentarily engage the inner surface 639 of the first drive sheave 618, thereby momentarily operatively connecting shaft extension 616 (and therefore the crankshaft 10) with the first drive sheave 618. Depending on what is driven by the second clutch member, this could result in a variety of different problems. For example, if the accessory that is driven by the first drive sheave 618 is a supercharger, this could result in additional air being transported into the combustion chambers of the engine 12 when it is not expected by the Engine Control Unit (ECU—not shown), resulting in turn in an unexpected change in the stoichiometry of the air/fuel mixture in the combustion chambers. This could lead to improper fuel combustion or other problems, and could ultimately result in a fault being generated by the ECU when it senses some unexpected change in engine performance brought on by the inadvertent momentary operation of the supercharger. Aside from noise and the potential for unintended operation of a driven accessory, the wrap spring 620 could incur repeated expansion and contraction if it was subject to vibration and was not preloaded. This could result in wear, fatigue and ultimately a reduced operating life for the wrap spring 620. By providing the aforementioned preload in the wrap spring 620, the preload overcomes these forces at least to some extent so as to provide the wrap spring 620 with a selected amount of resistance to expand away from the wrap spring support surface 660. As a result, problems with noise and with inadvertent operation of the driven accessory may be reduced or eliminated. The benefits of providing the preload in the wrap spring 620 described above may be applicable to any structure wherein the wrap spring 620 rotates with a clutch system input member and is selectively controllable to expand into engagement with a transfer member to operatively connect the clutch system input member with the transfer member, wherein an actuation device that includes an electromagnetic unit and an armature is used. The benefits of providing the preload in the wrap spring 620 may also be applicable when any other suitable kind of wrap spring engagement drive structure is used.

In the embodiment shown in FIGS. 12a and 12b, the wrap spring engagement drive structure includes the armature 622, the actuator 624, the electromagnetic unit 626, and the first drive sheave 618 itself.

Instead of providing a wrap spring support surface 660 that has a larger radius than the free state radius of the wrap spring 620, in an alternative embodiment the wrap spring 620 may be permitted to contract all the way to its free state radius and it may have a relatively larger radial spacing in that state from the inner surface 661 of the first drive sheave 618. By providing a large radial spacing, even if the wrap spring expands under centrifugal forces or engine accelerations, it will be unlikely to engage the inner surface 661 of the first drive sheave 618.

The armature 622 is preferably made from a material that has at least a selected magnetic permeability but that also reaches magnetic saturation under selected conditions, which are described further below. The material of the actuator 624, however, may be selected to have a relatively low magnetic permeability. This inhibits magnetic flux from being transferred through the actuator 624 and into the electromagnetic unit 626.

In some embodiments, the face on the armature 622 that engages the first drive sheave 618, which may be referred to as the friction engagement surface 668, may have a relatively high coefficient of friction and may be largely responsible for generating a strong friction force with the first drive sheave 618. In some embodiments, the friction engagement surface 668 may have a similar coefficient of friction to the corresponding surface on the first drive sheave 618. In some embodiments it may be the corresponding surface on the first drive sheave 618 that has the relatively high coefficient of friction.

With reference to FIG. 12a, in some embodiments the friction engagement surface 668 is closer to the corresponding flux transfer surface on the first drive sheave 618 (shown at 680) than the nearby flux transfer surface shown at 682 on the electromagnetic unit 626 is to the surface 680. This relative proximity of the friction engagement surface 668 to the first drive sheave 618 causes the magnetic flux to preferentially pass into the armature 622. It will be noted however, that even if some flux were transferred from the first drive sheave 618 directly into the electromagnetic unit 626, there would be a sufficient magnetic force on the armature 622 to draw the armature 622 into engagement with the first drive sheave 618 and as the armature 622 began to move towards the first drive sheave 618, the flux lines would begin to shift to preferentially pass into the armature 622 from the first drive sheave 618. It will be noted that this may occur even in embodiments wherein the friction engagement surface 668 on the armature 622 is positioned at the same distance from the mutually facing surface of the first drive sheave 618 as the nearby surface on the electromagnetic unit 626, and even in some embodiments wherein the friction engagement surface 668 on the armature 622 is positioned a bit farther from the mutually facing surface of the first drive sheave 618 than the nearby surface on the electromagnetic unit 626.

The electromagnetic unit 626 generates a magnetic flux that is transported through the first drive sheave 618, the armature 622 and back into the electromagnetic unit 626. The magnetic flux path (i.e. the magnetic circuit) is generally illustrated by arrows 700 shown in FIG. 12c). The electromagnetic unit 626 includes an electromagnet 669. Energization of the electromagnet 669 generates the magnetic flux. The electromagnetic unit 626 further includes an electromagnetic unit housing 670 that holds the electromagnet 669. The electromagnetic unit housing 670 connects to a clutch housing 671 that is configured to mount to a stationary member 672, which may be, for example, the engine block or the engine cover. In a preferred embodiment the engine block or whatever the stationary member is, is made from a non-magnetizable material, such as, for example, a type of aluminum (i.e. pure aluminum or an aluminum alloy).

When the crankshaft extension 616 is rotating and the first drive sheave 618 is stationary the wrap spring 620, the actuator 624 and the armature 622 rotate with the crankshaft extension 616. When it is desired to engage the engagement clutch 614 (i.e. to bring the clutch to the engaged position so as to operatively connect the crankshaft extension 616 to the first drive sheave 618), the electromagnetic unit 626 is energized, generating a magnetic flux in the first drive sheave 618. This magnetic flux draws the armature 622 axially into engagement with the first drive sheave 618 with sufficient force to frictionally retard the armature 622 and the second end 642 of the wrap spring 620 relative to the first end 640 of the wrap spring 620. This movement of the second end 642 of the wrap spring 620 causes the wrap spring 620 to radially expand into engagement with the wrap spring engagement surface 639 on the first drive sheave 618 thereby operatively connecting the crankshaft extension 616 with the first drive sheave 618.

When the electromagnetic unit 626 is deenergized, there is no longer a magnetic flux in the first drive sheave 618, or there may remain a small, residual magnetic flux in the first drive sheave 618. As a result, the force of engagement between the armature 622 and the first drive sheave 618 is greatly reduced, possibly to zero if there is no longer any residual magnetic flux in the first drive sheave 618. As a result, the bias of the wrap spring 620 that urges the wrap spring 620 towards its free state will overcome whatever frictional force there may be between the armature 622 and the first drive sheave 618, and will thus cause the wrap spring 620 to contract, and thus to retract from the inner surface 639 of the first drive sheave 618, thereby operatively disconnecting the crankshaft extension 616 from the first drive sheave 618.

In the embodiment shown in FIGS. 11a-13c the crankshaft extension 616 may be considered to be an clutch system input member. One or more of first drive sheave 618, the first driven sheave, or the belt that connects them may be considered to be a transfer member, in the sense that the engagement clutch 614 operatively connects or disconnects the clutch system input member (i.e. the crankshaft 10 or the crankshaft extension 616), with respect to the first drive sheave 618, and the one way clutch 74 that could be used on first and second driven sheaves that are both similar to driven sheave 26 in FIGS. 2a-3b, operatively connects the transfer member (i.e. the first drive sheave 618) to the input shaft 15.

Figure 6:
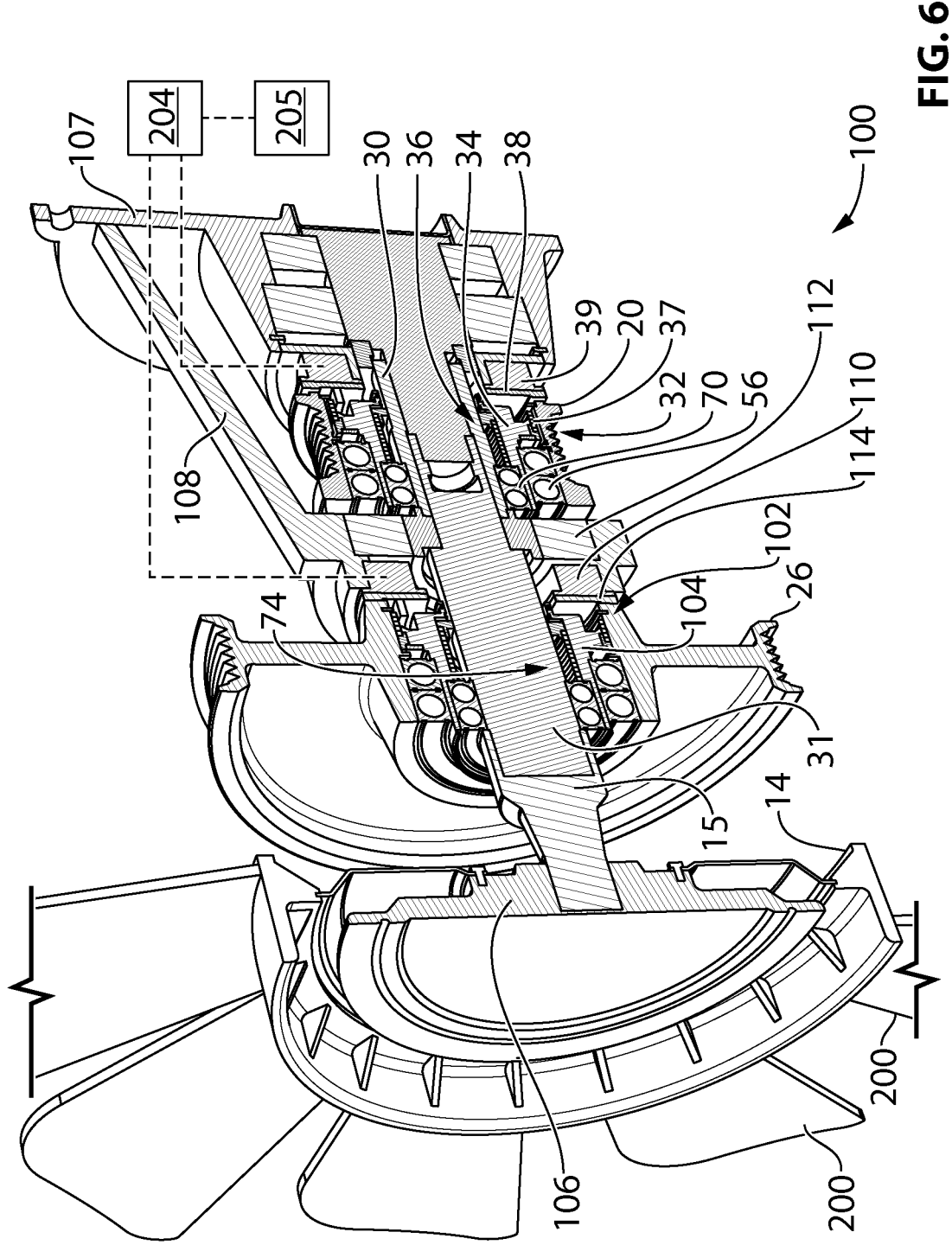
FIG. 6 is a perspective sectional view of a multi-speed drive in accordance with another embodiment of the invention.
Figure 7:
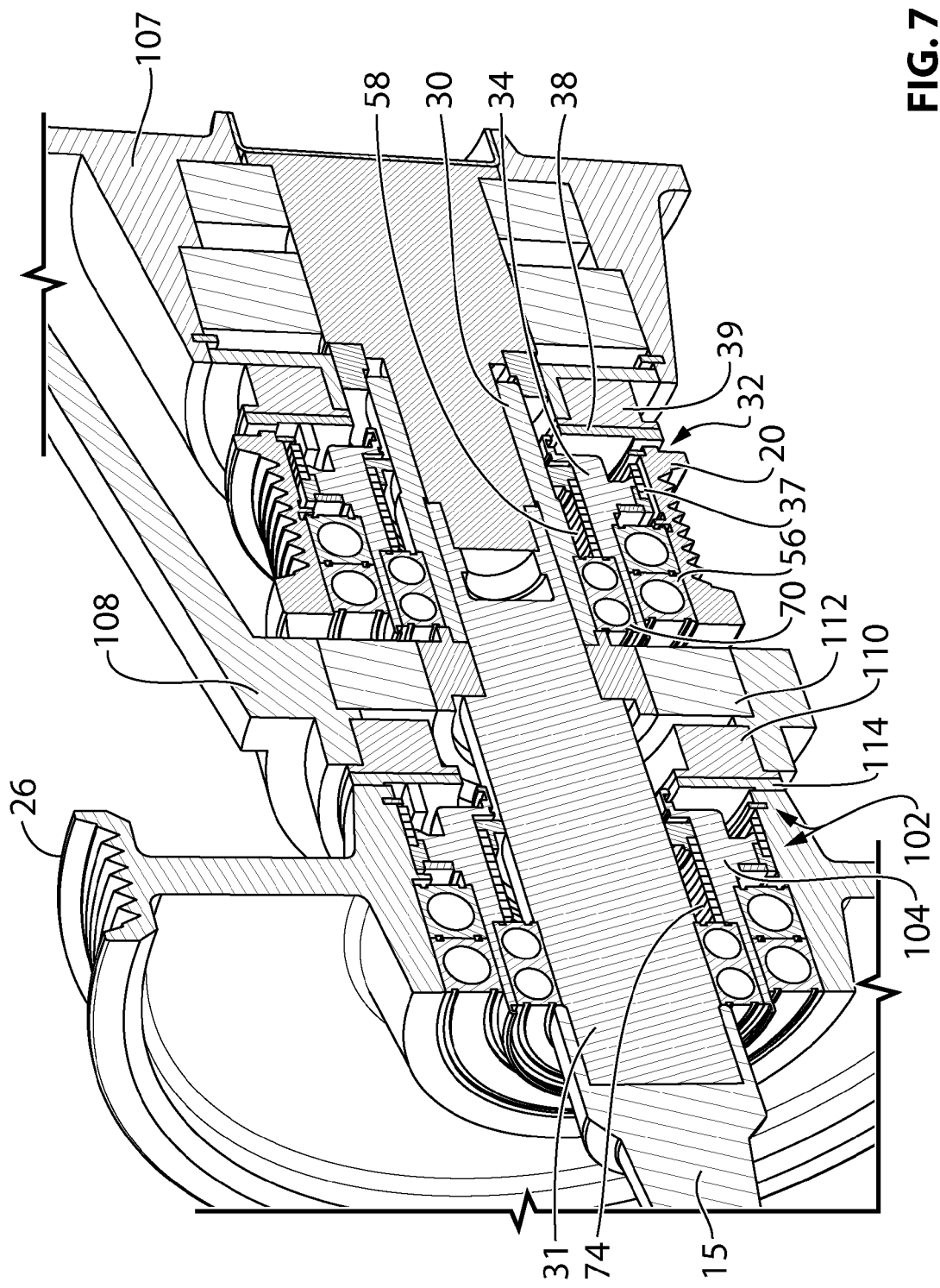
FIG. 7 is a magnified perspective sectional view of a portion of the multi-speed drive shown in FIG. 6.

Reference is made to FIGS. 6 and 7, which show the driven end of a multi-speed drive 100 in accordance with another embodiment of the invention. The drive end and the endless drive elements of the multi-speed drive 100 may be the same as the drive end of the multi-speed drive 14 shown in FIG. 1. The multi-speed drive 100 may be similar to the multi-speed drive 14, except that the multi-speed drive 100 has a third speed at which it is capable of driving the input shaft 15, wherein the third speed is zero. To provide this capability, a primary structural difference between the multi-speed drive 100 and the multi-speed drive 14 is that in the multi-speed drive 100, the second driven sheave 26 is operatively connectable to the input shaft 15 through a second engagement clutch 102, a second transfer member 104 and the second overrunning clutch 74. In this exemplary embodiment the second overrunning clutch 74 is a one-way wrap spring clutch and may be substantially identical to the first overrunning clutch 36, however, as noted above it could be any suitable type of clutch, such as a roller clutch as shown in FIGS. 2a and 2b, a sprag clutch, a needle roller clutch, a diode clutch or any other suitable type of clutch. The second engagement clutch 102, the second transfer member 104 may be substantially identical to the first engagement clutch 32 and the first transfer member 34 associated with the first driven sheave 20.

As can be seen in FIG. 6, the load 14 is a fan. The input shaft 15 in this embodiment extends from a fan hub, shown at 106. The free end of the input shaft 15 mates at one end of the second shaft extension 31. The other end of the second shaft extension 31 mates with the first shaft extension 30. A support member 107 bolts to some structural element of the vehicle and rotatably supports the first shaft extension 30, and also supports the rest of the driven end of the multi-speed drive 100. A spider bracket 108 extends from the support member 107 to support the second electromagnetic coil, shown at 110, which is part of the second engagement clutch 102. It will also be noted that, in this embodiment, the spider bracket 108 further supports a bearing 112, which in turn rotatably supports the second shaft extension 31.

When the crankshaft 10 rotates, the first and second driven sheaves 20 and 26 rotate by virtue of the direct connection between them and the first and second drive sheaves 618 and 634 via the endless drive elements, with the first driven sheave 20 rotating at the first (high) speed and with the second driven sheave 26 rotating at the second (low) speed. When it is desired to rotate the load 12 at the high speed, the first electromagnetic coil 39 is not energized, and thus the armature 38 is in its first position so that the first driven sheave 20 is operatively connected to the first transfer member 34. As a result, the first transfer member 34 is driven to rotate at the speed of the first driven sheave 20 (i.e. the high speed). The input shaft 15 is accelerated by the first transfer member 34 to the high speed via the first overrunning clutch 36. While this takes place, the second driven sheave 26 continues to be driven at the second (low) speed. When driving the input shaft 15 at the high speed, it is not important which position the armature 114 from the second engagement clutch 102 is in. Regardless of whether the second driven sheave 26 is operatively connected to the second transfer member 104, the input shaft 15 rotates faster than the second transfer member 104, which is permitted by the second overrunning clutch 74.

When it is desired to change the speed of rotation of the input shaft 15 from high speed to low speed, the first electromagnetic coil 39 is energized, so as to stop the first transfer member 34 and operatively disconnect the first driven sheave 20 from the first transfer member 34. Furthermore, the second electromagnetic coil 110 is not energized, so that the second driven sheave 26 is operatively connected to the second transfer member 104. When the input shaft 15 decelerates to a speed that is below the speed of the second transfer member 104, the second overrunning clutch 74 provides an operative connection from the second drive sheave 26 to the input shaft 15. As a result, the input shaft 15 is maintained at the second speed.

When it is desired to stop the input shaft 15, the first and second electromagnetic coils 39 and 110 are energized, so as to stop the first and second transfer members 34 and 104 and operatively disconnect the first and second driven sheaves 20 and 26 from the input shaft 15. As a result, the input shaft 15 stops.

Providing the three-speed drive 14 is advantageous in many situations. For example, where the load 12 is a fan, as noted above, there are situations wherein the fan is needed to operate at the high speed to keep the engine coolant sufficiently cool, such as, for example, when the engine is at low RPM on a very hot day and the vehicular load is high (as occurs, for example, when the vehicle is towing a trailer, or a boat, or the like or some other towing load). It will be noted however that the higher the speed of the fan, the greater the effective reduction in horsepower of the vehicle it causes, since more horsepower is required to keep the fan at the high speed. Furthermore, the higher the speed of the fan, the greater the reduction in fuel economy that results. In other situations, high speed operation of the fan is not necessary to keep the engine coolant sufficiently cool, however, and a lower speed of operation of the fan is sufficient. In such situations the fan may be driven at the lower speed so as to provide sufficient cooling of the engine coolant, while providing higher fuel economy and/or greater effective horsepower for the vehicle.

However, when the vehicle's speed is sufficiently high, and/or when the outside temperature is sufficiently low, and/or when the vehicular load is sufficiently small the fan is not necessary at all for providing cooling to the engine coolant because the flow of air coming in through the vehicle's grille may be sufficient to control the temperature of the engine coolant. In some situations the fan itself may be driven to rotate by the air flow coming into the engine compartment through the grille. By stopping the fan entirely, an even greater improvement is provided to the fuel economy of the vehicle and to the horsepower of the vehicle. It is contemplated that, for at least some vehicle owners, most of the time the vehicle will not require the fan to operate at all, some smaller portion of the time the fan may be operated at the slow speed, and for an even smaller portion of the time the fan may need to be operated at the high speed in order to provide sufficient cooling.

Additionally, the ability to operatively disconnect the first and second driven sheaves 20 and 26 completely from the input shaft 15 provides the vehicle with the capability of driving in relatively deep water (such as when crossing a stream when off-roading) without damaging or stressing the fan. By contrast, with prior art vehicles that have a belt driven fan, the fan is always rotating. As a result, if the vehicle is going to drive in deep water, the fan may be at risk of damage to itself or to other portions of the vehicle if the fan is not built sufficiently sturdily. Alternatively, in such prior art vehicles, the fan may be made relatively robust to withstand the increased stresses incurred when driving in water. However, such a robust (and likely heavier) construction may mean that the fan will draw a lot of horsepower from the engine.

It will be noted that, while the first and second driven sheaves 20 and 26 are shown in some embodiments as being operatively disconnectable from the input shaft 15 it is alternatively possible to provide the engagement clutches (and optionally the overrunning clutches) on the drive sheaves 16 and 18 so that the first and second drive sheaves are operatively disconnectable from the input shaft 15. In yet another embodiment, it is possible to put the engagement clutches from one of the drives (e.g. the high speed drive) on the drive sheave (e.g. drive sheave 16), and the engagement clutches from the other of the drives (e.g. the low speed drive) on the driven sheave (e.g. driven sheave 26). The overrunning clutches may be positioned anywhere suitable (e.g. on a drive sheave or on a driven sheave) as long as they are operatively between the associated engagement clutch and the input shaft of the load. For any clutch system wherein the engagement clutch is on the drive sheave, it will be understood that the drive sheave would be that clutch system's input member.

For the purpose of providing two speeds, consisting of a non-zero speed and a zero speed, the multi-speed drive need not include a second drive sheave, a second belt, a second driven sheave or any of the components associated therewith, such as a second overrunning clutch, a second transfer member, and a second engagement clutch. Furthermore, there is also no need for a first overrunning clutch or a first transfer member. Thus, such a multi-speed drive may include a drive sheave, a driven sheave, a belt and an engagement clutch. The engagement clutch could be on either the drive sheave, or on the driven sheave.

The first engagement clutch 32 may be connected directly between the driven sheave 20 and the shaft extension 30. Alternatively, the first engagement clutch 32 may be connected between the crankshaft 10 and the first drive sheave 16. An example of a multi-speed drive that includes a non-zero speed and a zero speed is shown at 300 in FIG. 14.

Figure 14:
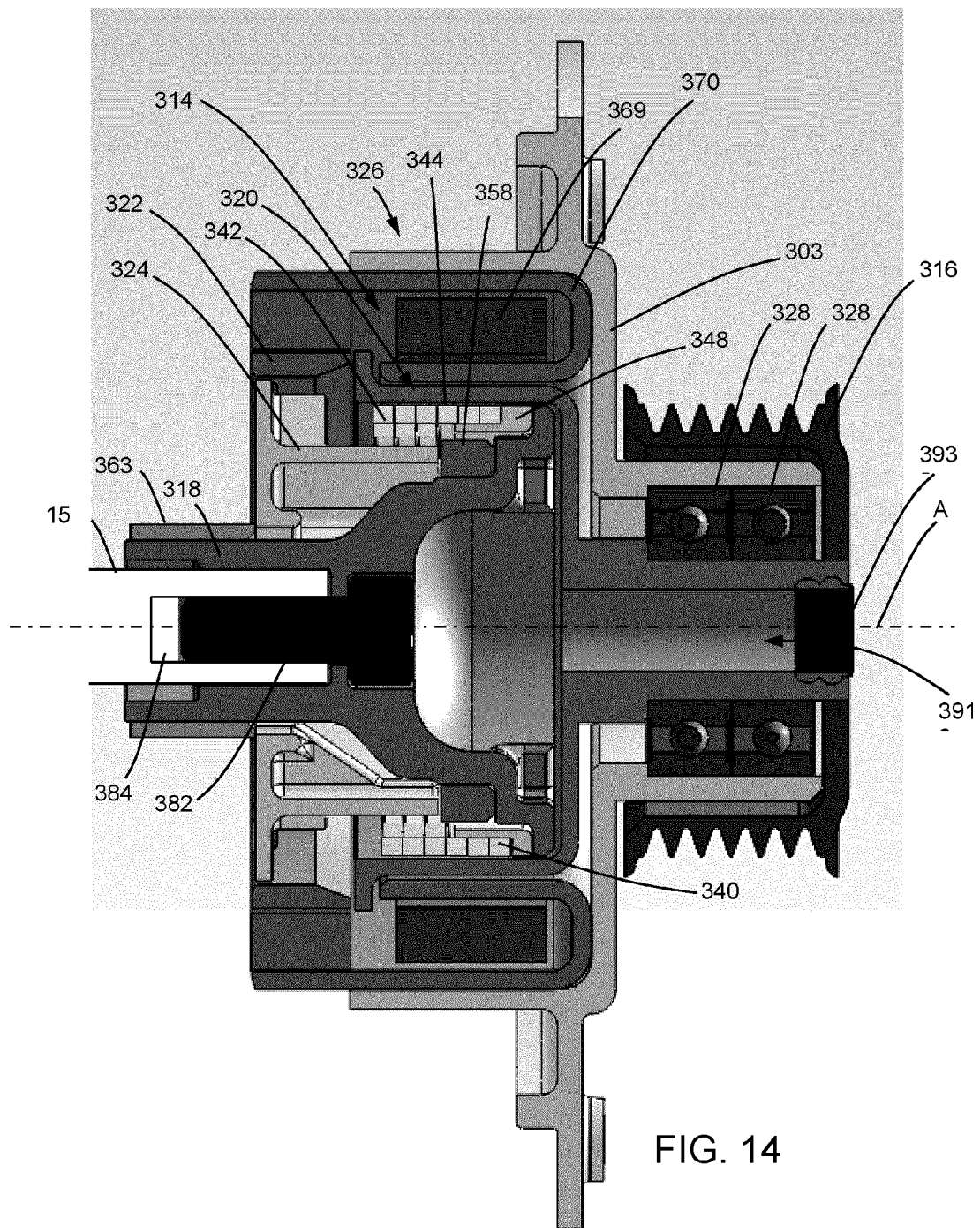
FIG. 14 is a sectional side view of a portion of a multi-speed drive in accordance with yet another embodiment of the invention.

In FIG. 14, only the driven sheave, shown at 316, is shown, along with the engagement clutch shown at 314, the shaft extension shown at 318 and the input shaft 15 of the load. The drive sheave may be the drive sheave 16 shown in FIG. 1.

The engagement clutch 314 includes a wrap spring 320, an armature 322, an actuator 324 and an electromagnetic unit 326.

The engagement clutch 314 is movable from a disengaged position shown in FIG. 14 to an engaged position by transmission of a magnetic flux from the electromagnetic unit 326 through the driven sheave 316, the armature 322 and back into the electromagnetic unit 326. The engagement clutch 314 may be referred to as being engaged when it in the engaged position and may be referred to as being disengaged or unengaged when it is in the disengaged position.

The driven sheave 316 may be rotatably supported on a stationary member 303, which may be referred to as an electromagnetic unit support member, via one or more bearing members 328. In this embodiment, there are two bearing members 328 which are ball bearings however any other suitable type of bearing member could be used.

The electromagnetic unit support member 303 itself mounts to an accessory housing (not shown) so as to locate the electromagnetic unit 326 and the driven sheave 316 about the axis A.

The shaft extension 318 is driven by the driven sheave 316 when the engagement clutch 314 is engaged, and may be idle when the engagement clutch 314 is disengaged. In the embodiment shown in FIG. 14, the shaft extension 318 mounts to the input shaft 15 by means of mating splines on the shaft extension 318 and the input shaft 15 and by means of a threaded fastener 382 that passes through the shaft extension 318 and into an aperture 384 in the end of the input shaft 15.

A cap 393 can be inserted into the aperture in the driven sheave 316 (shown at 391) through which a fastener tool (e.g. a hex driver) is passed to drive the fastener 382 into the input shaft 15.

The armature 322 is rotationally operatively connected with a second end 342 of the wrap spring 320 (i.e. via the actuator 324 in the embodiment shown). The actuator 324 is rotationally operatively connected with the armature 322. The carrier 348 is rotationally operatively connected to a first end 340 of the wrap spring 320. The carrier 348 is rotationally operatively connected with the shaft extension 318.

The actuator 324, the armature 322, the wrap spring 320 and the carrier 348 are mounted to the shaft extension 318 and are thus stationary when the engagement clutch 314 is disengaged.

The actuator 324 is kept in position axially at one end by an actuator retainer 363 which is fixed to the shaft extension 318 (e.g. by press-fit) and at another end by a carrier retainer 358 which is fixed to the shaft extension 318 (e.g. by press-fit), and which also engages the carrier 348 to hold it in place axially.

The carrier 348 may be engaged with the shaft extension 318 by way of lugs on one of them which engage lug slots on the other. The actuator 324 in the embodiment shown in FIG. 14 is separate from the armature and engages the armature 322 in a way that permits axial sliding of the armature 322 relative to the actuator 324 but that rotationally couples them together. The first and second ends of the wrap spring 320 (shown at 340 and 342 respectively) may be engaged by the carrier 348 and the actuator 324 in similar manner to the engagement of the first and second ends of the wrap spring 37 with the carrier and the driver 52 in the embodiment shown in FIGS. 2a-3b).

The electromagnetic unit 326 includes an electromagnetic coil 369 and an electromagnetic unit housing 370. The electromagnetic unit housing connects to the electromagnetic unit support member 303 by any suitable means, such as by fasteners, press-fit, staking or the like. Energization of the electromagnetic coil 369 generates a magnetic flux that passes from the electromagnetic coil 369, through the electromagnetic unit housing 370, through the driven sheave 316, through the armature 322, back into the housing 370 and back into the coil 369, thereby forming a magnetic circuit. Such a structure is shown in U.S. Provisional application 61/622, 501, the contents of which are incorporated herein by reference. The magnetic flux draws the armature 322 into engagement with the rotating sheave 316 with sufficient force to frictionally drive the armature 322 and the second end 342 of the wrap spring 320 rotationally about the axis A relative to the first end 340 of the wrap spring 320 so as to radially expand the wrap spring 320 into engagement with the driven sheave 316 thereby operatively connecting the driven sheave 316 to the shaft extension 318.

The engagement clutch 314 shown in FIG. 14 may be controlled by the controller 204 shown in FIG. 2a.

In another embodiment, a two speed drive that includes one non-zero speed and a zero speed may be provided by providing the engagement clutch 614 and the drive sheave 618 mounted in association with the crankshaft 10, (similar to what is shown in FIG. 11a, except without the sheave 634), a simple driven sheave with or without an overrunning clutch, and with or without an isolation member) mounted to a driven sheave, and a belt for transferring torque from the drive sheave to the driven sheave when permitted by the engagement clutch permits. In an embodiment an overrunning clutch may also be provided on the drive end, downstream from the engagement clutch. Additionally or alternatively, an isolation member, such as a torsion spring or a resilient polymeric (e.g. rubber) layer may be provided on the drive sheave 620.

When the driver of the vehicle approaches deep water that will contact the blades of the fan, shown at 200, the driver may press a button on the vehicle dashboard to energize the electromagnetic coil 39 (or 369) so as to operatively disconnect the first driven sheave 20 (or 316) from the input shaft 15. The vehicle can then enter the water without causing damage to the fan blades. Alternatively, the vehicle may include the controller 204 that controls the operation of the electromagnetic coil 39 (or 369) automatically based on the detection of deep water by a suitable sensor, shown at 205 in FIG. 6. The sensor 205 may be any suitable type of sensor, such as for example, a magnetic or mechanical float sensor or a conductive level sensor.

It will be noted that, while any suitable type of engagement clutch 32 (or 314) can be used to operatively connect or disconnect the first driven sheave 20 (or 316) from the input shaft 15, it is particularly advantageous to use the type of engagement clutch that incorporates a wrap spring, as shown in the figures. Such a clutch is relatively less sensitive to contact with water than some other types of clutch, such as some types of friction plate clutches. Furthermore, it is particularly advantageous to use a wrap spring that transfers torque from one member to another member by engagement of the coils of the wrap spring against a radially inner surface of one of the members and by engagement of one end of the wrap spring with the other member. Such a configuration is capable of withstanding many cycles of operation (i.e. of engagement and disengagement of the coils from the radially inner surface) and is not subject to the shear stresses that ultimately lead to the failure of some traditional wrap springs, which couple two shafts together and bridge a gap therebetween or which couple two inner surfaces together and bridge a gap therebetween.

Figure 8:
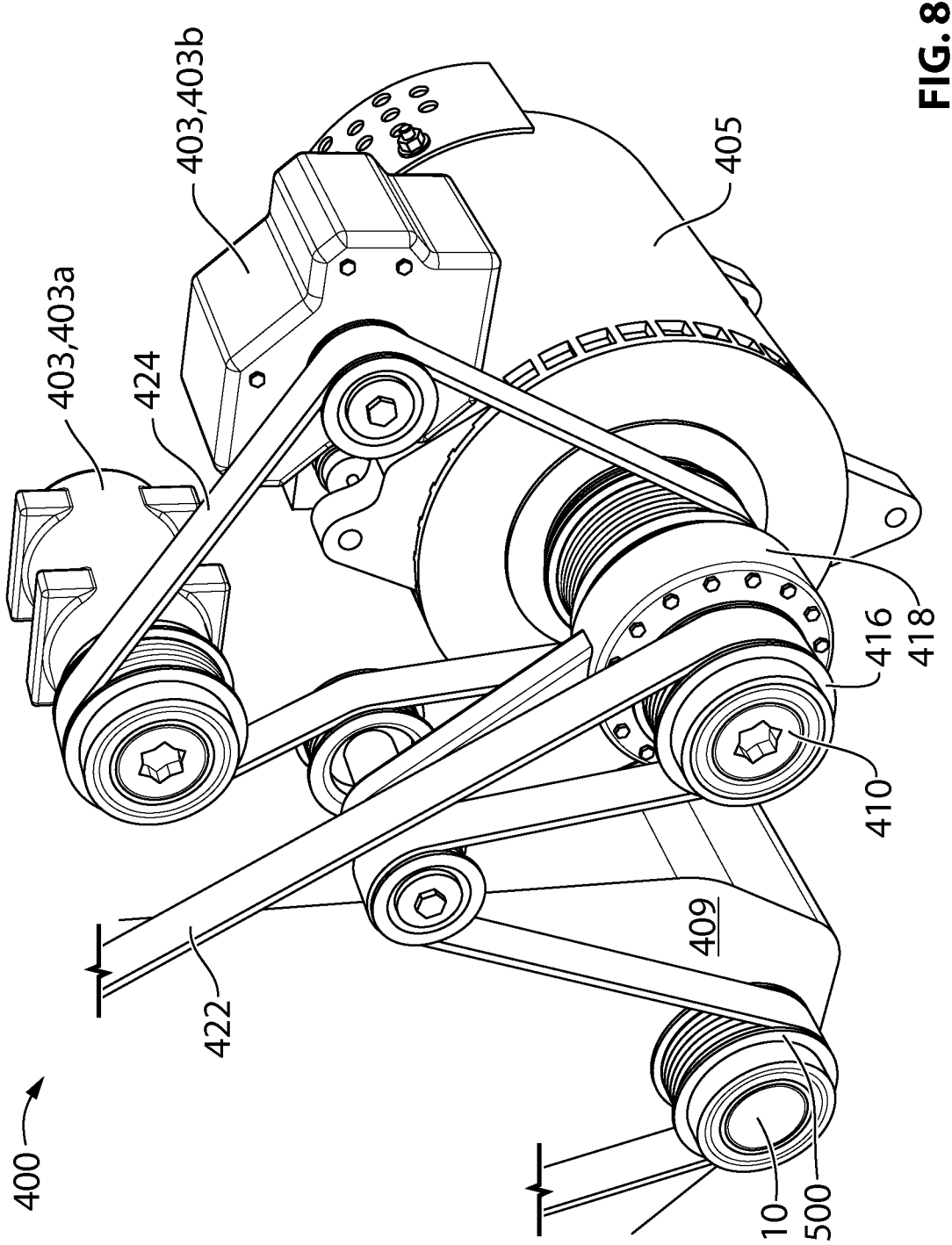
FIG. 8 is a perspective sectional view of a multi-speed drive in accordance with another embodiment of the invention.

Reference is made to FIG. 8, which shows an alternative embodiment of a multi-speed drive identified at 400. A distinction between the multi-speed drive 400 and the multi-speed drive shown in FIGS. 2a-3b is as follows: The multi-speed drive 400 includes a first drive sheave 416 that is mounted on an intermediate shaft 410, and a second drive sheave 418 that is mounted on the intermediate shaft 410. When the multi-speed drive 400 operates in a first mode, the first drive sheave is driven by a crankshaft output sheave 500 through a belt 422, in which case, it drives the intermediate shaft, which in turn drives the second drive sheave 418. The second drive sheave 418 in turn drives one or more driven sheaves 420 on one or more accessories shown at 403 via a second belt 424. The accessories 403 may be any suitable accessories such as, for example, an air conditioning compressor 403a and a power steering pump 403b. The intermediate shaft 410 is itself connected to a motor/generator unit 405 (which may be referred to as MGU 405). When the intermediate shaft 410 is driven by the first drive sheave 416, the MGU 405 may act as a generator, converting the rotary motion of the shaft 410 into electricity which can be used to charge a battery (not shown) on the vehicle.

When the engine (shown as a simple oblong shape at 409) is off, however, the multi-speed drive 400 operates in a second mode, wherein the MGU 405 is operated as a motor, and drives the intermediate shaft 410 instead. The first drive sheave 416 in this instance is operatively disconnected from the intermediate shaft 410. Thus, the MGU 405 drives the second drive sheave 418 and thus drives the accessories 403 via the second belt 424. The MGU 405 may be operated to drive the accessories 403 at a similar speed that they are driven at by the engine through the first drive sheave 416, or alternatively, the MGU 405 may be operated to drive the accessories 403 at a different speed than they would be driven at by the engine through the first drive sheave 416.

Such a situation can occur when, for example, the vehicle is at a stoplight and it is equipped with ISAF (idle-stop accessory function) technology, whereby the engine is automatically turned off in order to conserve fuel but some of the accessories are still desirable to operate.

Alternatively or additionally, the multi-speed drive 400 may be advantageous to reduce torsional vibrations that can occur. For example, in some situations torsional vibrations generated by the engine at a particular frequency lead to resonance at a particular accessory, which can ultimately lead to premature failure of a number of components or the triggering of faults within the controller for the accessory. Such a situation has been found to occur in particular by the torsional vibrations generated by some four-cylinder engines at idle (i.e. approximately 700-800 RPM), where the accessory is a typical modern alternator. When a situation occurs where the torsional vibrations are considered to be causing resonance or are considered to have the potential to lead to resonance, the MGU 405 may be operated to drive the intermediate shaft 410 at a higher speed than the engine so as to reduce or eliminate the torsional vibrations or potentially to alter their frequency so as to reduce the aforementioned tendency towards resonance at a particular accessory. Alternatively, the engagement clutch 432 can be disengaged and the MGU 405 can drive the intermediate shaft 410 at any selected speed, which could be a higher speed, the same speed or even a lower speed than the shaft 410 was driven at by the engine.

The controller 204 that controls the operation of the engagement clutch 432 and the MGU 405 may be programmed in a variety of ways to mitigate resonance. For example, it may be programmed simply to drive the MGU 405 at a higher speed than the first drive sheave 416 or to disconnect the first drive sheave 416 from the intermediate shaft 410 via the engagement clutch 432 and then drive the MGU 405 at any selected speed, when the engine reaches a selected range of RPMs (optionally in conjunction with detecting other conditions such as the state of charge of the battery or the like). Alternatively or additionally, the controller 204 may be programmed to detect cases of resonance directly by use of a speed sensor or the like on an idler sheave so as to directly detect the repeated changes in sheave speed and to detect any increase in amplitude that could be considered to be the onset of resonance.

Figure 9:
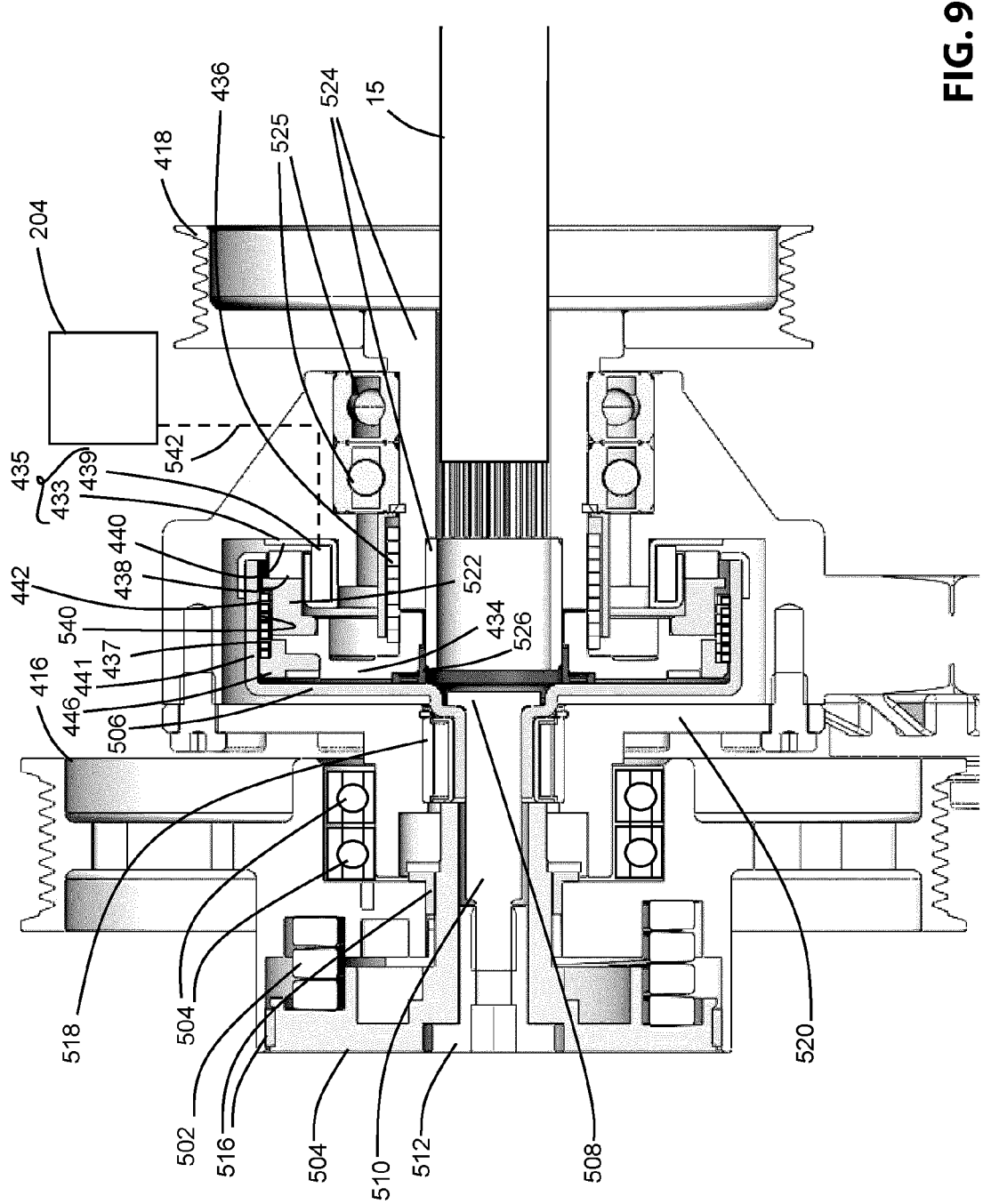
FIG. 9 is a sectional side view of a portion of the multi-speed drive shown in FIG. 8.

Referring to FIG. 9, the first drive sheave 416 is operatively connectable to the intermediate shaft 410 through an optional isolation member 502, through a first intermediate member 504, through a second intermediate member 506, through an engagement clutch 432, through a transfer member 434, through an overrunning clutch (i.e. also known as a one-way clutch) 436 and into the intermediate shaft 410. The isolation member 502 may be in the form of a torsion spring that provides some amount of isolation to the first intermediate member 504 from torsional vibrations incurred by the sheave 416. The isolation member 502 is shown as a torsion spring, however it will be noted that in some other embodiments the isolation member could be a resilient polymeric layer (e.g. made of rubber or the like) that is sandwiched between first and second portions of the first drive sheave 416.

The first and second intermediate members 504 and 506 may abut each other axially with a selected axial clamp force so that the first intermediate member 504 can transfer torque to the second intermediate member 506. The axial clamp force is provided by clamping the two intermediate members 504 and 506 between a flange end 508 of a support shaft 510 and a threaded fastener 512 that mounts to the other end 514 of the support shaft 510. First and second bearing members 516 (which are in this embodiment bushings) support the first drive sheave 416 on the first intermediate member 504. The bushings permit rotational relative movement between the sheave 416 and the intermediate member 504.

Another bearing member shown at 518 (which in this instance is a roller bearing) rotatably supports the second intermediate member 506 on a stationary member 520, which may be mounted anywhere suitable in the vehicle. It will be noted that the first drive sheave 416 is supported on the stationary member 520 through bearing members shown at 521 (which are in this case ball bearings). The engagement clutch 432 includes an electromagnetic unit 435 (includes an electromagnetic coil 439 and an electromagnetic coil housing 433), an armature 438, an actuator 522, a wrap spring 437 and a carrier 446. The carrier 446 is rotationally operatively connected to the first end of the wrap spring 437 shown at 441, and the actuator 522 is rotationally operatively connected to the second end 442 of the wrap spring 437. The carrier 446 is rotationally operatively connected to the transfer member 434.

The transfer member 434 is supported on a shaft extension shown at 524 through a bushing 526 to permit relative rotational movement between the transfer member 434 and the intermediate shaft 410. A one-way clutch 436 (also known as an overrunning clutch) is provided between the transfer member 434 and the shaft extension 524 so as to permit the intermediate shaft 410 to rotate faster than the transfer member 434 (and therefore faster than the drive sheave 416). The shaft extension 524 supports the second drive sheave 418 thereon and mounts fixedly to the intermediate shaft 410 such that the intermediate shaft 410, the shaft extension 524 and the second drive sheave 418 co-rotate. Bearing members 525 support the shaft extension 524 and therefore the intermediate shaft 410.

In the embodiment shown in FIG. 9, when the coil 439 is not energized the wrap spring 437 is engaged with the inner surface shown at 540 of the second intermediate member 506 and so the wrap spring 437, the actuator 522, the carrier 442 and the armature 438 all rotate with the first drive sheave 416. Energization of the coil 439 draws the armature 438 into engagement with a stationary friction surface 440 (which in this example is on the coil housing 433), which drags and stops rotation of the armature 438 (and in turn the actuator 522 and the second end 442 of the wrap spring 437) relative to the first end 441 of the wrap spring 437, which in turn causes the wrap spring 437 to collapse and retract from the inner surface shown at 540 of the second intermediate member 506, thereby operatively disconnecting the first drive sheave 416 (and therefore the engine) from the intermediate shaft 410. At that point, the MGU 405 can be used to drive the intermediate shaft 410 and the second drive sheave 418 at any selected speed, whether it be higher, the same, or lower than the speed of the first drive sheave 416.

It will be noted that there is no biasing member (e.g. a leaf spring or the like) that biases the armature 438 or the actuator 522 towards any particular position. By omitting a biasing member, several advantage are achieved. For example, omitting the biasing member means that there is relatively little resistance to movement of the armature 438 between the engaged position (whereat it is drawn into engagement with the friction surface 440) and the disengaged position (whereat it is space from the friction surface 440). Because there is so little resistance to movement of the armature 438, the energization of the electromagnetic unit 435 may require less than about 10 W to provide sufficient holding force of the armature on the friction surface 440 to retract the wrap spring 437 from the inner surface 540 of the second intermediate member 506.

The operation of the engagement clutch 432 may be controlled by the controller 204. Because so little power is needed to engage the armature 438 with the friction surface 440, the controller 204 may be directly connected the electromagnet coil 439 via an electrical conduit shown at 542 and a MOSFET or the like in the controller 204 may directly control the current through the conduit 542. This arrangement is much less expensive than it is for some clutches of the prior art, such as some friction plate clutches. Those clutches require a significant amount of power to engage, and less power but still a significant amount of power to hold the engaged position. Those clutches would not be controllable directly from a controller and would thus require the controller to be connected to a relay, which would be connected to a source of higher electrical current than can typically be handled by a controller. The relay would then be controlled by the controller 204 in order to control the current to the clutch. Conduits would extend from the source of electrical current (which is ultimately the battery) to the relay and from the relay to whatever clutch actuation mechanism requires it. Thus, because of the low power needed to operate the clutch 432, thereby permitting it to be controlled directly from the controller 204, there is no need for the aforementioned relay, nor for the conduits that can carry high current.

Another advantage to providing the low actuation force for the armature 438 combined with the use of a durable clutch configuration (which in this instance is the wrap spring 37 which transfers torque through engagement of end 41 with the transfer member 34 and through engagement of the radially outer surface of the coils 44 with the first driven sheave 20) is that a control scheme can be applied to the engagement clutch 32 that permits it to be repeatedly engaged and disengaged without sacrificing the operating life of the wrap spring 37. Such a control scheme could be applied in several situations. For example, when it is desired to engage the clutch 32 (i.e. to engage the wrap spring 37 with the sheave 20) to bring the speed of the input shaft 15 to the speed of the sheave 20, it is possible to cycle the energization of the coil 39 off and on according to any suitable scheme so as to briefly engage and disengage the wrap spring 37 from the sheave 20. This will input torque to the input shaft 15 and the accessory in small doses so as to gradually increase the speed of the input shaft 15 over some selected period of time. Many different control schemes could be used, such as, for example, a pulse width modulation scheme. In tests, the wrap spring 37 has proven to exhibit little or no wear after over 900000 cycles of engagement and disengagement at a frequency of one cycle per second. Also, in tests the wrap spring 37 was found to performed successfully at cycle frequencies of 4 cycles per second. Furthermore, it has been found that the wrap spring 37 can be engaged in about 0.1 seconds if desired. With this capability, the engagement clutch 32 can be engaged very quickly if needed in order to handle an urgent situation, such as to drive a water pump to cool an overheating engine, or slowly in order to reduce stresses on the various components involved.

The multi-speed drives described herein have been described as including one or more drive sheaves mounted on the crankshaft 10 of the engine. In embodiments wherein any engagement and overrunning clutches are provided on the driven side, it is alternatively possible, however for a customer to purchase the driven end only of the multi-speed drive and to provide the one or more drive sheaves and the belts themselves.

The overrunning clutches 36 and 74, the transfer members 34 and 104, and the engagement clutches 32 and 102 have been described as being mounted in association with the first and second driven sheaves 20 and 26. It is alternatively possible, however, for these components to be mounted in association with the first and second drive sheaves 16 and 18. It is another alternative possibility to mount some of the components (e.g. the overrunning clutches 36 and 74) in association with the first and second driven sheaves 20 and 26 and to mount other components (e.g. the engagement clutches 32 and 102) in association with the first and second drive sheaves 16 and 18. An embodiment wherein an engagement clutch is shown on a drive sheave is shown in FIGS. 1-4c of U.S. Provisional application 61/622,501, the contents of which, as noted above, are incorporated by reference. In that embodiment, a member that mounts to the crankshaft would be the clutch system input member (or the crankshaft itself may be the input member). The input member is selectively operatively connectable to a sheave through an engagement clutch, so that the sheave can be selectively driven by the crankshaft or disconnected from the crankshaft.

The particular non-zero speed or speeds that are selected to be provided by the multi-speed clutch 14, 100 or 200 may be any suitable speeds. These speeds depend at least in part on the particular load being rotated. Where first and second non-zero speeds are provided, they may be very different from each other, or they may be relatively close to each other.

It will be noted that in at least some cases, by providing a multi-speed drive such as one of the drives 14, or 100 one can downsize a driven accessory that would have otherwise been used in the vehicle. For example, the cooling fan for a vehicle is sized to handle the worst case scenario that the vehicle is expected to have to handle, such as towing a heavy load while at low engine RPM and while climbing a steep grade. When selecting the speed ratio to use for a single-speed, belt-driven fan (the speed ratio being the speed of the fan relative to crankshaft speed) care needs to be taken to ensure that the highest speeds of the fan during periods of high-engine RPM will not damage the bearings that support the rotating portion of the fan. Based on the speed ratio, the size of the fan would be selected to provide the necessary cooling under the aforementioned worst-case conditions (which occur at low engine RPM). However, by providing a multi-speed drive, preferably with at least two non-zero speeds, the fan can be provided with a first speed ratio that is relatively high so that the fan runs at a higher speed than the single-speed fan would be under low engine RPM conditions, and a second speed ratio that is lower than the speed ratio that would have been used in a single-speed fan to handle situations wherein a high degree of cooling is not necessary (which is likely to be a significant portion of the driving time of the vehicle). Selecting the first speed ratio to be higher than would have been used on a single-speed fan is possible because the fan will only run at that ratio under low engine RPM conditions and only for a certain portion of the overall driving time of the vehicle, whereas at higher engine RPM, the second, lower speed ratio would be used. As a result, the two-speed fan will never see speeds that would damage the bearings. A direct benefit, however, of selecting a higher-than-usual speed ratio for low engine RPM conditions, is that the fan itself can be made smaller without sacrificing cooling performance compared to a single-speed fan, thereby saving weight, reducing cost, and freeing up room in the engine compartment which is typically cramped in many vehicles.

In another scenario, a vehicle may be designed initially with a particular alternator, which is configured based on its capacity and its speed, to handle a certain electrical load, such as, for example, 200 Amperes, so that the alternator can keep the battery sufficiently charged even under conditions of heavy current draw from the battery. However, at some point, a manufacturer may introduce certain options to the vehicle, some of which may consume a significant amount of current. This can increase the total electrical load that the alternator is required to handle in order to permit the battery to receive sufficient charge during periods of heavy current draw. If a single speed alternator were used, a primary alternative choice at that stage would be to supply a larger capacity alternator with the vehicle. However, the size, weight and cost of an alternator quickly grows with capacity. Additionally, the bearings that are used to support the larger alternator rotor may not be capable of handling the high speeds that the bearings of the original alternator were able to tolerate, since a bearing's capacity to handle high speed in general decreases as the size of the bearing increases. By providing a multi-speed drive with the alternator, a higher capacity could be reached by providing a first speed ratio that is higher than the speed ratio used on the single speed alternator, and a second speed ratio that is lower than the speed ratio used on the single speed alternator. This may have little negative effect on the operating life of the alternator as the higher speed setting would only be used at those occasional times when the current draw on the battery exceeds what could be provided by the second, lower speed setting.

In the embodiments described above, the engagement and disengagement of the engagement clutches was described as being carried out using an electromagnetic coil and an armature which is drawn in a particular direction based on the magnetic flux generated by the coil. It will be noted that other types of actuation device could be used instead. A variety of suitable alternative actuation devices are shown in PCT publication WO2012/024790, the contents of which are hereby incorporated by reference. For example, an actuation device that includes a motor (e.g. an electric motor) that actuates a brake member to cause retardation of the second end 42 of the wrap spring 37 relative to the first end 41 could be used. A suitable biasing member or some other means can be used to bring the second end 42 of the wrap spring 37 back to its original position, whether that be an engaged position or a disengaged position.

Figure 15:
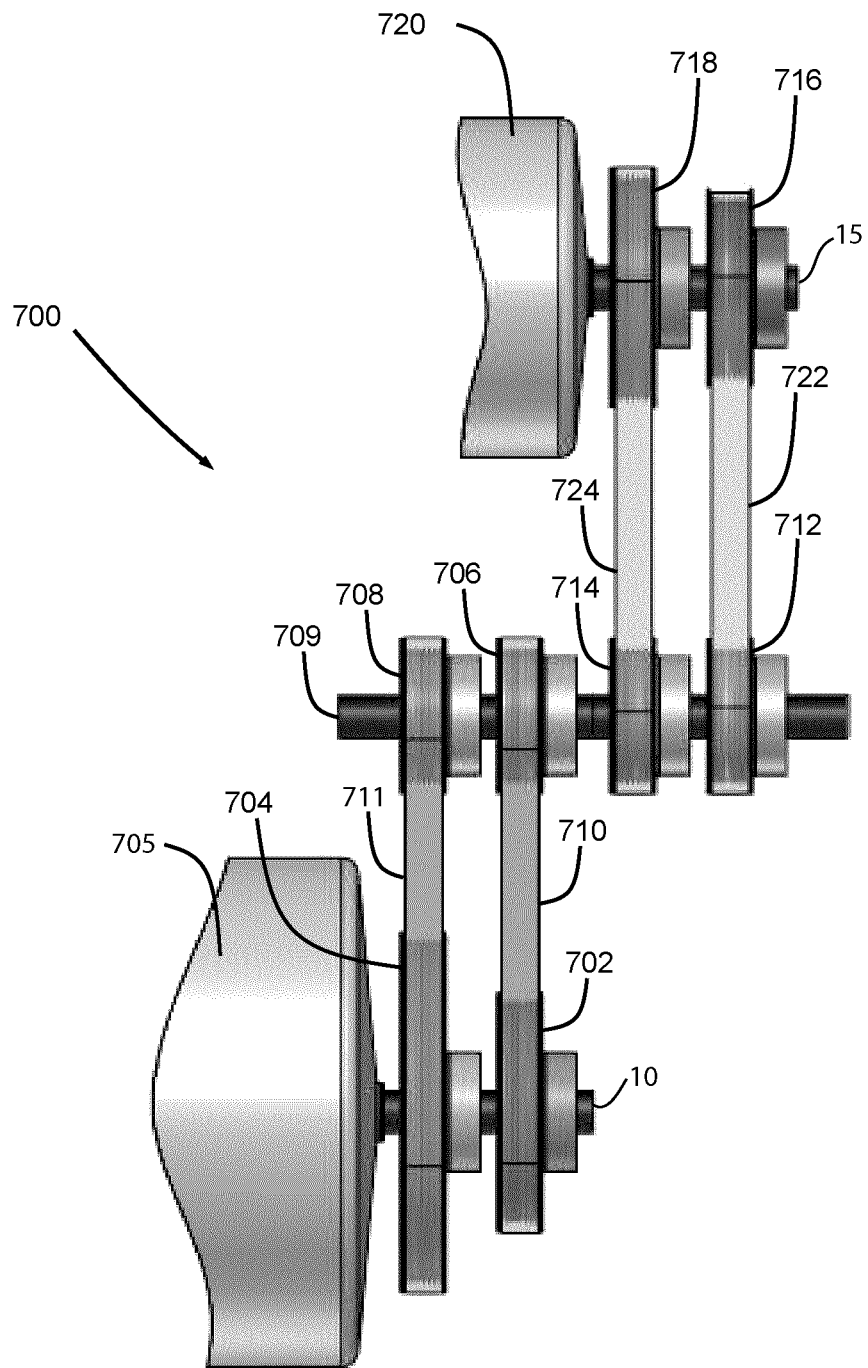
FIG. 15 is a top plan view of a multi-speed drive in accordance with yet another embodiment of the invention.

Reference is made to FIG. 15, which shows a multi-speed drive 700 in accordance with another embodiment of the invention. A distinction of the multi-speed drive 700 is that it includes first and second drive sheaves 702 and 704 on a crankshaft 10 of an engine 705, which transmit power to first and second intermediate driven sheaves 706 and 708 on a jackshaft 709, via belts 710 and 711, and two further intermediate drive sheaves 712 and 714 on the jackshaft 709, which transmit power to two driven sheaves 716 and 718 on an input shaft 15 of an accessory 720, via belts 722 and 724. With this configuration, it is possible to have four non-zero speeds with which to drive the accessory. Additionally, if engagement clutches and overrunning clutches are provided where necessary, such as on both intermediate driven sheaves 706 and 708, a zero speed can be provided. Such an arrangement may be preferable to having four drive sheaves on the crankshaft 10 and four driven sheaves on the accessory input shaft 15, particularly where there may be space issues around the crankshaft 10 or around the accessory input shaft 15.

While the above description constitutes a plurality of embodiments of the present invention, it will be appreciated that the present invention is susceptible to further modification and change without departing from the fair meaning of the accompanying claims.

The invention claimed is:

1. A multi-speed drive for driving an input shaft of a load, comprising:
    a first clutch system including an engagement clutch, a transfer member and a first overrunning clutch;
    a first clutch system input member that, when operatively connected to the input shaft by the first clutch system, drives the input shaft to rotate at a first speed,
    wherein the engagement clutch is positionable in a first position and in a second position, wherein in the first position the engagement clutch operatively connects the first clutch system input member to the transfer member, and wherein in the second position the engagement clutch operatively disconnects the first clutch system input member from the transfer member,
    wherein the first overrunning clutch is configured to permit the input shaft to rotate in a drive direction faster than the transfer member, and is configured to operatively connect the transfer member to the input shaft when the transfer member is rotating in the drive direction faster than the input shaft;
    wherein the transfer member is in radial relationship with the first overrunning clutch;
    a second clutch system including a second overrunning clutch; and a second clutch system input member that, when operatively connected to the input shaft through the second clutch system, drives the input shaft to rotate at a second speed that is slower than the first speed,
    wherein the second overrunning clutch is configured to permit the input shaft to rotate in the drive direction faster than the second clutch system input member, and is configured to operatively connect the second clutch system input member to the input shaft when the second clutch system input member is rotating in the drive direction faster than the input shaft.

2. A multi-speed drive as claimed in claim 1, wherein the first clutch system input member is a first driven sheave that is coaxial with the input shaft and that has a first diameter and the second clutch system input member is a second driven sheave that has a second diameter that is larger than the first diameter.

3. A multi-speed drive as claimed in claim 1, wherein each overrunning clutch includes an overrunning clutch wrap spring.

4. A multi-speed drive as claimed in claim 3, wherein each transfer member has a radially inner surface and wherein driving any transfer member faster than the input shaft causes the associated overrunning clutch wrap spring to expand into engagement with the radially inner surface.

5. A multi-speed drive as claimed in claim 1, wherein the engagement clutch includes:
    an engagement clutch wrap spring having a first end, a second end and a plurality of helical coils that extend between the first and second ends, wherein the first end is operatively connected with one of the transfer member and the first clutch system input member and wherein an radially outer surface of the helical coils are selectively operatively connectable with the other of the transfer member and the first clutch system input member, and
    an actuation device that is configured to cause the second end to move angularly relative to the first end so as to control the operative connection between the radially outer surface of the coils with said other of the transfer member and the first clutch system input member.

6. A multi-speed drive as claimed in claim 5, wherein the actuation device includes
- an armature, wherein the armature is rotationally operatively connected to the second end of the engagement clutch wrap spring, wherein the armature is axially movable between a first position and a second position, wherein in the first position the armature rotates freely with the transfer member and permits the helical coils of the engagement clutch wrap spring to engage the first clutch system input member so as to operatively connect the first clutch system input member to the transfer member, and wherein in the second position the armature frictionally engages a stationary friction surface so as to reduce the speed of the armature relative to the transfer member, thereby causing movement of the first end of the engagement clutch wrap spring relative to the first clutch system input member, which in turn causes the helical coils of the engagement clutch wrap spring to disengage from the first clutch system input member, thereby operatively disconnecting the first clutch system input member from the transfer member and stopping rotation of the transfer member, and
- an electromagnetic coil that is energizable via an electric current to drive the armature to the second position.

7. A multi-speed drive as claimed in claim 6, wherein the armature is biased towards the first position.

8. A multi-speed drive as claimed in claim 5, wherein the helical coils engage a radially inner surface of the first clutch system input member when the armature is in the first position.

9. A multi-speed drive as claimed in claim 5, wherein the actuation device includes
- an armature, wherein the armature is rotationally operatively connected to the second end of the engagement clutch wrap spring, wherein the armature is axially movable between a first position and a second position, wherein in the first position the armature is stationary, and wherein in the second position, the armature frictionally engages a rotating friction surface so as to drive the armature and the second end of the engagement clutch wrap spring relative to the first end of the engagement clutch wrap spring, so as to cause the helical coils of the engagement clutch wrap spring to expand radially and operatively connect to the first clutch system input member, thereby driving rotation of the transfer member, and
- an electromagnetic coil that is energizable via an electric current to drive the armature to the second position.

10. A multi-speed drive as claimed in claim 5, wherein the first clutch system input member is a first driven sheave, wherein the multi-speed drive further includes a first drive sheave that is operatively connectable to the first driven sheave via a first belt, and wherein the second clutch system input member is a second driven sheave, wherein the multi-speed drive further includes a second drive sheave that is operatively connectable to the second driven sheave via a second belt.

* * * * *